US010812807B2

(12) United States Patent
Jang et al.

(10) Patent No.: US 10,812,807 B2
(45) Date of Patent: Oct. 20, 2020

(54) INTRA-PREDICTION METHOD AND APPARATUS IN IMAGE CODING SYSTEM

(71) Applicant: LG ELECTRONICS INC., Seoul (KR)

(72) Inventors: Hyeongmoon Jang, Seoul (KR); Bumshik Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 98 days.

(21) Appl. No.: 16/306,837

(22) PCT Filed: Jun. 3, 2016

(86) PCT No.: PCT/KR2016/005919
§ 371 (c)(1),
(2) Date: Dec. 3, 2018

(87) PCT Pub. No.: WO2017/209328
PCT Pub. Date: Dec. 7, 2017

(65) Prior Publication Data
US 2019/0306511 A1 Oct. 3, 2019

(51) Int. Cl.
*H04N 19/159* (2014.01)
*H04N 19/105* (2014.01)
*H04N 19/124* (2014.01)
*H04N 19/132* (2014.01)
*H04N 19/176* (2014.01)
(Continued)

(52) U.S. Cl.
CPC ......... *H04N 19/159* (2014.11); *H04N 19/105* (2014.11); *H04N 19/11* (2014.11); *H04N 19/117* (2014.11); *H04N 19/124* (2014.11); *H04N 19/132* (2014.11); *H04N 19/176* (2014.11); *H04N 19/182* (2014.11);
(Continued)

(58) Field of Classification Search
CPC ............................ H04N 19/159; H04N 19/11
See application file for complete search history.

(56) References Cited

U.S. PATENT DOCUMENTS

2013/0034158 A1* 2/2013 Kirchhoffer .......... H04N 19/11 375/240.12
2013/0188698 A1* 7/2013 Chien .................... H04N 19/61 375/240.12
2017/0251213 A1* 8/2017 Ye ....................... H04N 19/513

FOREIGN PATENT DOCUMENTS

KR 10-2012-0100836 A 9/2012
KR 10-2013-0126928 A 11/2013
(Continued)

*Primary Examiner* — William C Vaughn, Jr.
*Assistant Examiner* — Jerry T Jean Baptiste
(74) *Attorney, Agent, or Firm* — Dentons US LLP

(57) ABSTRACT

An intra-prediction method according to the present invention comprises the steps of: obtaining information on an intra-prediction mode from a bitstream; determining an intra-prediction mode for a current block on the basis of the information on the intra-prediction mode; determining whether to apply coefficient induced intra-prediction (CIIP) to the current block; deriving neighboring samples of the current block on the basis of the determination of whether to apply the CIIP; and generating predicted samples of the current block on the basis of the intra-prediction mode and the neighboring samples. According to the present invention, corrected or improved neighboring samples can be generated, whereby intra-prediction performance can be improved.

13 Claims, 32 Drawing Sheets

START
Obtain information on an intra prediction mode from a bitstream — S3200
Determine an intra prediction mode for a current block based on the information on the intra prediction mode — S3210
Determine whether to apply the CIIP to the current block — S3220
Derive neighboring samples for the current block based on whether to apply the CIIP — S3230
Generate prediction samples for the current block based on the intra prediction mode and the neighboring samples — S3240
END

(51) Int. Cl.

| | |
|---|---|
| ***H04N 19/33*** | (2014.01) |
| ***H04N 19/46*** | (2014.01) |
| ***H04N 19/117*** | (2014.01) |
| ***H04N 19/184*** | (2014.01) |
| ***H04N 19/11*** | (2014.01) |
| ***H04N 19/182*** | (2014.01) |

(52) U.S. Cl.

CPC ........... *H04N 19/184* (2014.11); *H04N 19/33* (2014.11); *H04N 19/46* (2014.11)

(56) References Cited

FOREIGN PATENT DOCUMENTS

| | | | |
|---|---|---|---|
| KR | 10-1354151 | B1 | 1/2014 |
| KR | 10-2015-0038688 | A | 4/2015 |

* cited by examiner

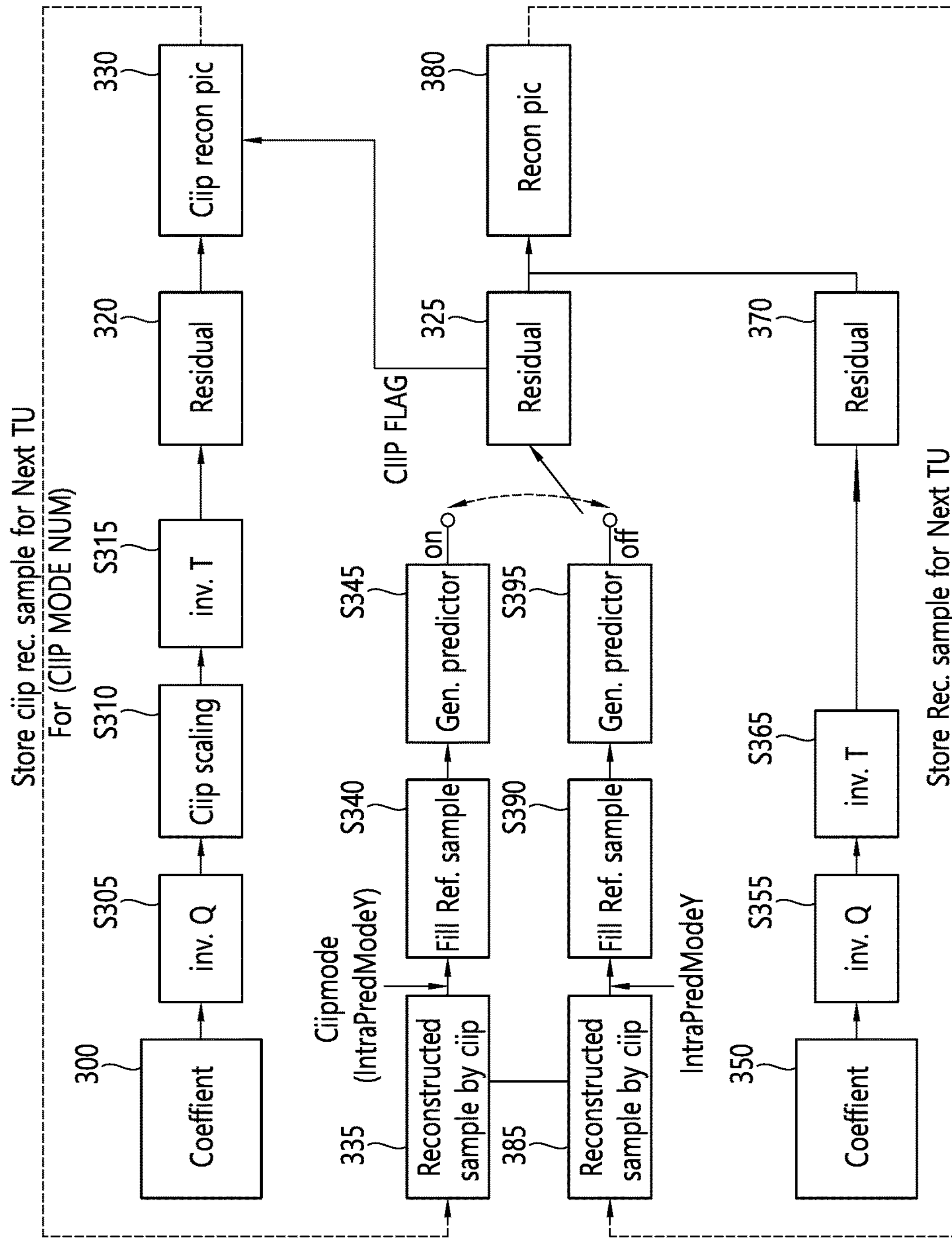
FIG. 3
Store ciip rec. sample for Next TU
For (CIIP MODE NUM)
300
Coeffient
S305
inv. Q
S310
Ciip scaling
S315
inv. T
320
Residual
330
Ciip recon pic
Ciipmode
(IntraPredModeY)
335
Reconstructed sample by ciip
S340
Fill Ref. sample
S345
Gen. predictor
on
CIIP FLAG
325
Residual
380
Recon pic
385
Reconstructed sample by ciip
IntraPredModeY
S390
Fill Ref. sample
S395
Gen. predictor
off
350
Coeffient
S355
inv. Q
S365
inv. T
370
Residual
Store Rec. sample for Next TU Decode PU start
predModeIntra
S400
predModeIntra
== nonCIIP mode ?
S410
NO
YES
Parse CIIP flag
S420
Decode TU
S430
Last TU?
S440
NO
YES
Decode PU end Decode TU start
Quantized transform coefficients for current block
S500
Inverse quantization
S510
Inverse transformation
S520
Current block residual
S530
Quantized transform coefficients for neighbor block
S540
Inverse quantization
S550
CIIP scaling
S560
Inverse transformation
S570
Current block predictor
S580
+
S590
Decode TU end

INTRA-PREDICTION METHOD AND APPARATUS IN IMAGE CODING SYSTEM

CROSS-REFERENCE TO RELATED APPLICATIONS

This application is the National Stage filing under 35 U.S.C. 371 of International Application No. PCT/KR2016/005919, filed on Jun. 3, 2016, the contents of which are hereby incorporated by reference herein in their entirety.

BACKGROUND OF THE INVENTION

Field of the Invention

The present invention relates to a technique for image coding and, more particularly, to a method and apparatus for an intra prediction in an image coding system.

Related Art

Demand for high-resolution, high-quality images such as HD (High Definition) images and UHD (Ultra High Definition) images have been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY OF THE INVENTION

The present invention provides a method and apparatus for improving intra prediction efficiency.

The present invention also provides a method and apparatus for generating an intra prediction sample using transform coefficients of a neighboring block.

The present invention also provides a method and apparatus for deriving a prediction sample by applying a scaling matrix to transform coefficients for a neighboring block, and generating an intra prediction sample based on the neighboring sample.

The present invention also provides a method and apparatus for determining whether to apply coefficient induced intra prediction (CIIP) for a current block adaptively.

The present invention also provides a method and apparatus for determining whether to apply CIIP in PU or CU unit adaptively.

In an aspect, a method for intra prediction performed by a decoding device is provided. The intra prediction method includes obtaining information for an intra prediction mode from a bitstream, determining an intra prediction mode for a current block based on the information for the intra prediction mode, determining whether to apply coefficient induced intra prediction (CIIP) to the current block, deriving neighboring samples for the current block based on whether to apply the CIIP, and generating prediction samples for the current block based on the intra prediction mode and the neighboring samples.

In another aspect, a method for intra prediction performed by an encoding device is provided. The intra prediction method includes determining an intra prediction mode for a current block, determining whether to apply coefficient induced intra prediction (CIIP) to the current block, deriving neighboring samples for the current block based on whether to apply the CIIP, generating prediction samples for the current block based on the intra prediction mode and the neighboring samples, and encoding and outputting information for the intra prediction mode.

In still another aspect, a decoding device for performing intra prediction is provided. The decoding device includes an entropy decoder for obtaining information for an intra prediction mode from a bitstream, and a predictor for determining an intra prediction mode for a current block based on the information for the intra prediction mode, determining whether to apply coefficient induced intra prediction (CIIP) to the current block, deriving neighboring samples for the current block based on whether to apply the CIIP, and generating prediction samples for the current block based on the intra prediction mode and the neighboring samples.

In still another aspect, an encoding device for performing intra prediction is provided. The encoding device includes a predictor for determining an intra prediction mode for a current block, determining whether to apply coefficient induced intra prediction (CIIP) to the current block, deriving neighboring samples for the current block based on whether to apply the CIIP, generating prediction samples for the current block based on the intra prediction mode and the neighboring samples, and an entropy encoder for encoding and outputting information for the intra prediction mode.

According to the present invention, neighboring samples proper for an intra prediction of a current block may be derived, and accordingly, intra prediction performance may be improved.

According to the present invention, different from the fact that a reconstructed sample of a neighboring block is used for neighboring samples for an intra prediction of a current block conventionally, CIIP scaling is applied to a transform coefficient of a neighboring block and modified or improved neighboring samples may be generated, and accordingly, the intra prediction performance may be improved.

In addition, according to the present invention, based on a coded block flag (CBF) of a neighboring block, an intra prediction mode and/or whether to apply CIIP for a neighboring block, it may be determined whether to apply CIIP for a current block adaptively, and accordingly, prediction efficiency may be improved.

BRIEF DESCRIPTION OF THE DRAWINGS

FIG. 3 schematically illustrates an intra prediction method considering CIIP.

DESCRIPTION OF EXEMPLARY EMBODIMENTS

Figure 1:
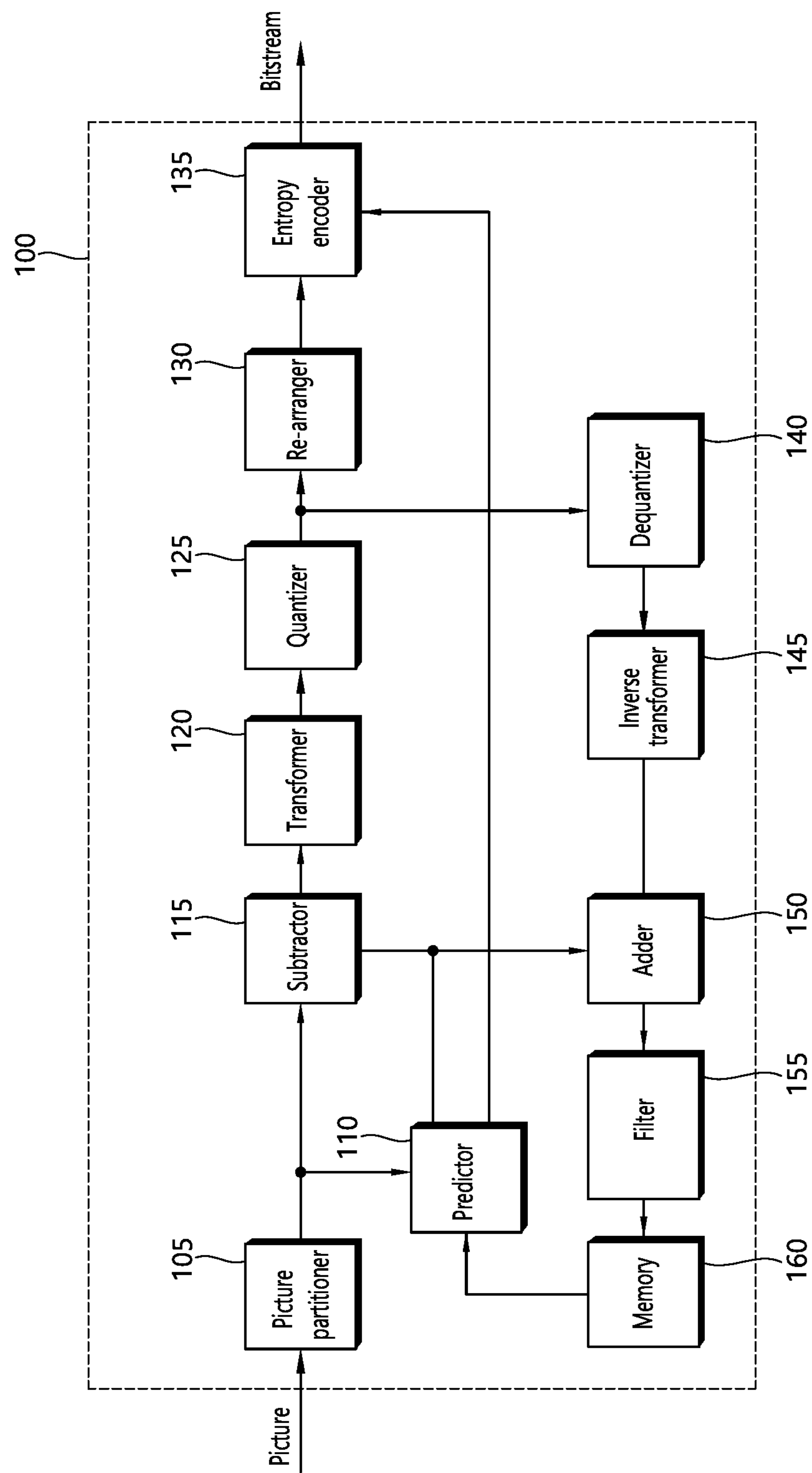
FIG. 1 is a schematic diagram illustrating a configuration of a video encoding device to which the present invention is applicable.

The present invention may be modified in various forms, and specific embodiments thereof will be described and illustrated in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, embodiments of the present invention will be described in detail with reference to the accompanying drawings. In addition, like reference numerals are used to indicate like elements throughout the drawings, and the same descriptions on the like elements will be omitted.

In the present specification, generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a 'sample' may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 briefly illustrates a structure of a video encoding device to which the present invention is applicable.

Referring to FIG. 1, a video encoding device 100 includes a picture partitioner 105, a predictor 110, a subtractor 115, a transformer 120, a quantizer 125, a re-arranger 130, an entropy encoder 135, a dequantizer 140, an inverse transformer 145, an adder 150, a filter 255, and a memory 160.

The picture partitioner 105 may split an input picture into at least one processing unit. Here, a processing unit may be a coding unit (CU), a prediction unit (PU) or a transform unit (TU). The coding unit is a unit block of coding, and a largest coding unit (LCU) may be split into coding units of deeper depth according to a quad-tree structure. In this case, the largest coding unit may be used as a final coding unit or a coding unit may be recursively split into coding units of deeper depth as necessary and a coding unit having an optimal size may be used as a final coding unit based on coding efficiency according to video characteristics. When a smallest coding unit (SCU) is set, a coding unit cannot be split into a coding unit smaller than the smallest coding unit. Here, the final coding unit refers to a coding unit partitioned or split into a predictor or a transformer. A prediction unit is a block partitioned from a coding unit block and may be a unit block of sample prediction. Here, the prediction unit may be divided into sub blocks. A transform block can be split from a coding unit block according to the quad-tree structure and may be a unit block that derives a transform coefficient and/or a unit block that derives a residual signal from a transform coefficient.

Hereinafter, the coding unit may be called a coding block (CB), the prediction unit may be called a prediction block (PB), and the transform unit may be called a transform block (TB).

The prediction block or the prediction unit may mean a specific area having a block shape in a picture, and may include an array of a prediction sample. Further, the transform block or the transform unit may mean a specific area having a block shape in a picture, and may include a transform coefficient or an array of a residual sample.

The predictor 110 may perform prediction on a processing target block (hereinafter, a current block), and may generate a prediction block including prediction samples for the current block. A unit of prediction performed in the predictor 110 may be a coding block, or may be a transform block, or may be a prediction block.

The predictor 110 may determine whether intra-prediction is applied or inter-prediction is applied to the current block. For example, the predictor 110 may determine whether the intra-prediction or the inter-prediction is applied in unit of CU.

In case of the intra-prediction, the predictor 110 may derive a prediction sample for the current block based on a reference sample outside the current block in a picture to which the current block belongs (hereinafter, a current picture). In this case, the predictor 110 may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor 110 may determine the prediction mode to be applied to the current block by using the prediction mode applied to the neighboring block.

In case of the inter-prediction, the predictor 110 may derive the prediction sample for the current block based on a sample specified by a motion vector on a reference picture. The predictor 110 may derive the prediction sample for the current block by applying any one of a skip mode, a merge mode, and a motion vector prediction (MVP) mode. In case of the skip mode and the merge mode, the predictor 110 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and can be discriminated from a coding order.

The subtractor 115 generates a residual sample which is a difference between an original sample and a prediction sample. If the skip mode is applied, the residual sample may not be generated as described above.

The transformer 120 transforms residual samples in units of a transform block to generate a transform coefficient. The transformer 120 may perform transformation based on the size of a corresponding transform block and a prediction mode applied to a coding block or prediction block spatially overlapping with the transform block. For example, residual samples can be transformed using discrete sine transform (DST) if intra-prediction is applied to the coding block or the prediction block overlapping with the transform block and the transform block is a 4×4 residual array and is transformed using discrete cosine transform (DCT) in other cases.

The quantizer 125 may quantize the transform coefficients to generate a quantized transform coefficient.

The re-arranger 130 rearranges quantized transform coefficients. The re-arranger 130 may rearrange the quantized transform coefficients in the form of a block into a one-dimensional vector through a coefficient scanning method. Although the re-arranger 130 is described as a separate component, the re-arranger 130 may be a part of the quantizer 125.

The entropy encoder 135 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 135 may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The dequantizer 140 dequantizes values (transform coefficients) quantized by the quantizer 125 and the inverse transformer 145 inversely transforms values dequantized by the dequantizer 135 to generate a residual sample.

The adder 150 adds a residual sample to a prediction sample to reconstruct a picture. The residual sample may be added to the prediction sample in units of a block to generate a reconstructed block. Although the adder 150 is described as a separate component, the adder 150 may be a part of the predictor 110.

The filter 155 may apply deblocking filtering and/or a sample adaptive offset to the reconstructed picture. Artifacts at a block boundary in the reconstructed picture or distortion in quantization can be corrected through deblocking filtering and/or sample adaptive offset.

Sample adaptive offset may be applied in units of a sample after deblocking filtering is completed. The filter 155 may apply an adaptive loop filter (ALF) to the reconstructed picture. The ALF may be applied to the reconstructed picture to which deblocking filtering and/or sample adaptive offset has been applied.

The memory 160 may store a reconstructed picture or information necessary for encoding/decoding. Here, the reconstructed picture may be the reconstructed picture filtered by the filter 155. The stored reconstructed picture may be used as a reference picture for (inter) prediction of other pictures. For example, the memory 160 may store (reference) pictures used for inter-prediction. Here, pictures used for inter-prediction may be designated according to a reference picture set or a reference picture list.

Figure 2:
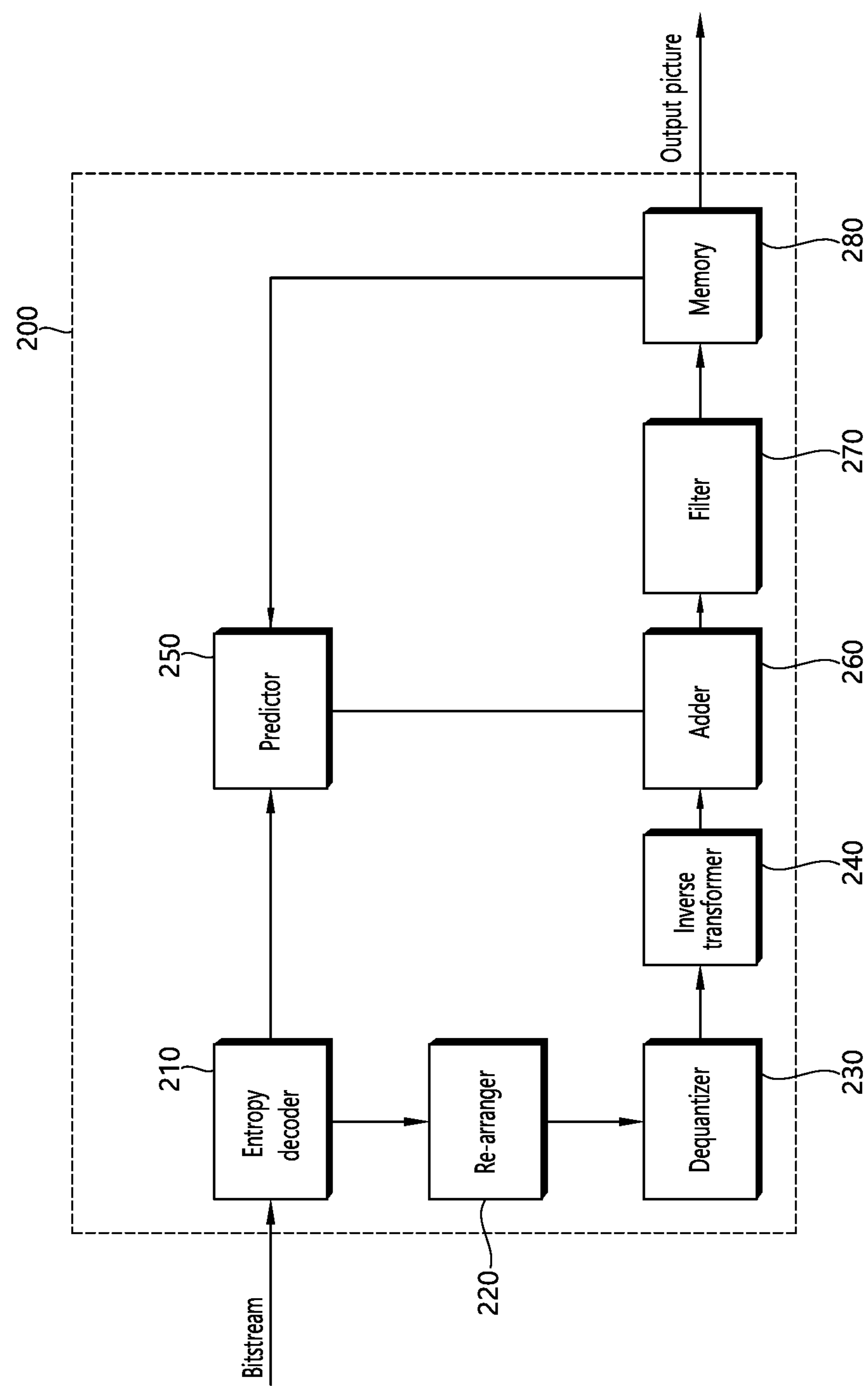
FIG. 2 is a schematic diagram illustrating a configuration of a video decoding device to which the present invention is applicable.

FIG. 2 briefly illustrates a structure of a video decoding device to which the present invention is applicable.

Referring to FIG. 2, a video decoding device 200 includes an entropy decoder 210, a re-arranger 220, a dequantizer 230, an inverse transformer 240, a predictor 250, an adder 260, a filter 270, and a memory 280.

When a bitstream including video information is input, the video decoding device 200 may reconstruct a video in association with a process by which video information is processed in the video encoding device.

For example, the video decoding device 200 may perform video decoding by using a processing unit applied in the video encoding device. Therefore, the processing unit block of video decoding may be a coding unit block, a prediction unit block, or a transform unit block. As a unit block of decoding, the coding unit block may be split according to a quad tree structure from a largest coding unit block. As a block partitioned from the coding unit block, the prediction unit block may be a unit block of sample prediction. In this case, the prediction unit block may be divided into sub blocks. As a coding unit block, the transform unit block may be split according to the quad tree structure, and may be a unit block for deriving a transform coefficient or a unit block for deriving a residual signal from the transform coefficient.

The entropy decoder 210 may parse the bitstream to output information required for video reconstruction or picture reconstruction. For example, the entropy decoder 210 may decode information in the bitstream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method can receive a bin corresponding to each syntax element in a bitstream, determine a context model using decoding target syntax element information and decoding information of neighboring and decoding target blocks or information of amabol/bin decoded in a previous step, predict bin generation probability according to the determined context model and perform arithmetic decoding of the bin to generate a symbol corresponding to each syntax element value. Here, the CABAC entropy decoding method can update the context model using information of a symbol/bin decoded for a context model of the next symbol/bin after determination of the context model.

Information about prediction among information decoded in the entropy decoder 210 may be provided to the predictor 250 and residual values, that is, quantized transform coefficients, on which entropy decoding has been performed by the entropy decoder 210 may be input to the re-arranger 220.

The re-arranger 220 may rearrange the quantized transform coefficients into a two-dimensional block form. The re-arranger 220 may perform rearrangement corresponding to coefficient scanning performed by the encoding device. Although the re-arranger 220 is described as a separate component, the re-arranger 220 may be a part of the quantizer 230.

The dequantizer 230 may de-quantize the quantized transform coefficients based on a (de)quantization parameter to output a transform coefficient. In this case, information for deriving a quantization parameter may be signaled from the encoding device.

The inverse transformer 240 may inverse-transform the transform coefficients to derive residual samples.

The predictor 250 may perform prediction on a current block, and may generate a prediction block including prediction samples for the current block. A unit of prediction performed in the predictor 250 may be a coding block or may be a transform block or may be a prediction block.

The predictor 250 may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 250 may derive a prediction sample for a current block based on a neighboring reference sample in a current picture. The predictor 250 may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor 250 may derive a prediction sample for a current block based on a sample specified in a reference picture according to a motion vector. The predictor 250 may derive the prediction sample for the current block using one of the skip mode, the merge mode and the MVP mode. Here, motion information required for inter-prediction of the current block provided by the video encoding device, for example, a motion vector and information about a reference picture index may be acquired or derived based on the information about prediction.

In the skip mode and the merge mode, motion information of a neighboring block may be used as motion information of the current block. Here, the neighboring block may include a spatial neighboring block and a temporal neighboring block.

The predictor 250 may construct a merge candidate list using motion information of available neighboring blocks and use information indicated by a merge index on the merge candidate list as a motion vector of the current block. The merge index may be signaled by the encoding device. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list can be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information about prediction may include a merge index indicating a candidate block having the best motion vector selected from candidate blocks included in the merge candidate list. Here, the predictor 250 may derive the motion vector of the current block using the merge index.

When the MVP (Motion vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the predictor 250 may select a prediction motion vector of the current block from the motion vector candidates included in the motion vector candidate list using the motion vector index. The predictor of the encoding device may obtain a motion vector difference (MVD) between the motion vector of the current block and a motion vector predictor, encode the MVD and output the encoded MVD in the form of a bitstream. That is, the MVD can be obtained by subtracting the motion vector predictor from the motion vector of the current block. Here, the predictor 250 may acquire a motion vector included in the information about prediction and derive the motion vector of the current block by adding the motion vector difference to the motion vector predictor. In addition, the predictor may obtain or derive a reference picture index indicating a reference picture from the aforementioned information about prediction.

The adder 260 can add a residual sample to a prediction sample to reconstruct a current block or a current picture. The adder 260 may reconstruct the current picture by adding the residual sample to the prediction sample in units of a block. When the skip mode is applied, a residual is not transmitted and thus the prediction sample may become a reconstructed sample. Although the adder 260 is described as a separate component, the adder 260 may be a part of the predictor 250.

The filter 270 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 280 may store a reconstructed picture or information necessary for decoding. Here, the reconstructed picture may be the reconstructed picture filtered by the filter 270. For example, the memory 280 may store pictures used for inter-prediction. Here, the pictures used for inter-prediction may be designated according to a reference picture set or a reference picture list. A reconstructed picture may be used as a reference picture for other pictures. The memory 280 may output reconstructed pictures in an output order.

In video or picture coding, intra prediction or inter prediction may be applied as described above for coding efficiency. When the intra prediction is applied, for a current block, neighboring samples of the current block in a current picture may be utilizes as reference samples. However, when the intra prediction is performed on the current block based on the neighboring samples, an error occurs inevitably to some extents, which causes an increase in a data amount for a residual signal, thereby decreasing coding efficiency.

Meanwhile, in the performing of the intra prediction, in order to increase intra prediction efficiency, modified neighboring samples may be derived to be used as reference samples instead of directly using the neighboring samples in the current picture. The modified neighboring samples may be derived by applying a scaling mask to transform coefficients including the neighboring samples. Hereinafter, a method of performing intra prediction by using the modified neighboring samples derived by applying the scaling mask to the transform coefficient of the neighboring block may be called coefficient induced intra prediction (CIIP). That is, in the intra prediction, the CIIP may generate residual samples modified for the neighboring block through inverse transform after applying the scaling mask to the transform coefficients of the neighboring block and generate the modified neighboring samples in the neighboring block based on the modified residual samples, and thus may perform prediction on the current block by using the modified neighboring samples. In other words, the CIIP may be regarded as a method in which modified neighboring samples are derived by applying a scaling mask in a frequency domain for a neighboring block, and intra prediction is performed based on the modified neighboring samples, so that a prediction sample of a current block can be derived similarly to an original sample. The scaling mask may be called a scaling matrix, and is a type of a filter applied in the frequency domain. The scaling matrix may be derived by using information learned based on a statistical characteristic between an original image and a prediction image in the frequency domain. A size of the scaling matrix may be equal to or smaller than a size of the transform coefficients. A procedure of applying the scaling mask to the transform coefficients may be called a CIIP scaling procedure. A modified neighboring sample having a value similar to a sample value of a current block can be derived based on the CIIP, thereby improving intra prediction performance.

Whether to apply the CIIP may be determined based on a CIIP flag. In the case that the CIIP flag is 1, the CIIP scaling is applied to the transform coefficients of the neighboring block, the scaled transform coefficients are inversely transformed to generate modified residual samples, modified neighboring samples are derived based on the modified residual samples, and intra prediction for the current block is performed based on the modified neighboring samples (that is, prediction samples in the current block are generated). Herein, the neighboring block may be a block including at least one of neighboring samples for intra prediction of the current block. Alternatively, the neighboring block may be a block including at least one of neighboring samples selected according to a prediction mode applied to the current block among the neighboring samples for intra prediction of the current block.

Meanwhile, in the case that the CIIP flag is 0, the intra prediction may be performed on the current block by using the existing reconstructed sample of a neighboring block.

A method of performing intra prediction by considering the CIIP may be performed as follows.

FIG. 3 schematically illustrates an intra prediction method considering CIIP. A procedure of FIG. 3 may be performed by a coding device. The coding device may include an encoding device or a decoding device.

Referring to FIG. 3, the coding device may perform intra prediction on a current block according to a different procedure depending on whether to apply the CIIP.

First, in the case that the CIIP is applied to the current block, the coding device derives transform coefficients by inversely quantizing quantized transform coefficients 300 of a neighboring block (step, S305), and applies CIIP scaling to the transform coefficients (step, S310). In this case, as described above, the coding device may apply a predetermined scaling mask to the transform coefficients.

The coding device inversely transforms the transform coefficients subjected to the CIIP scaling (step, S315), and derives a modified residual sample 320. The coding device may generate a CIIP reconstructed picture 330 based on a predictor 325 of the neighboring block and a modified residual sample 320. The predictor 325 may be called a prediction sample. Here, in obtaining of the predictor 325 of the neighboring block, the CIIP may not be applied to the neighboring block. That is, the predictor 325 of the neighboring block may be generated through a normal intra prediction method to which the CIIP is not applied. In addition, here, the CIIP reconstructed picture 330 includes a CIIP reconstructed sample 335. The coding device derives a neighboring reference sample (modified neighboring sample) of the current block based on the CIIP reconstructed sample 335 (step, S340). The coding device may generate a predictor, that is, a prediction sample, of the current block according to an intra prediction mode of the current block based on the derived neighboring reference sample (step, S345).

Meanwhile, in the case that the CIIP is not applied to the current block, the coding device derives transform coefficients by inversely quantizing quantized transform coefficients 350 of the neighboring block (step, S355), and inversely transforms the transform coefficients (step, S365) to derive a residual sample 370. In this case, the coding device does not apply a CIIP scaling procedure to the transform coefficients. The coding device may generate a reconstructed picture 380 based on the predictor 325 of the neighboring block and the residual sample 370. The reconstructed sample 380 includes a reconstructed sample 385. The coding device derives a neighboring reference sample (neighboring sample) of the current block based on the reconstructed sample 385 (step, S390). The coding device may generate a predictor of the current block according to an intra prediction mode of the current block based on the derived reference sample (step, S395).

In the performing of the intra prediction mode, a specific intra prediction mode (e.g., a DC mode, a planar mode, a directivity (angular) mode, etc.) may be determined in a PU, and a procedure of generating a prediction sample based on neighboring reference samples may be performed in a TU. In the case that intra prediction is applied to the PU, a region of the PU may include a region of one or more TUs. In this case, the one or more TUs may share the same intra prediction mode.

The decoding procedure according to whether to apply the CIIP may be performed in detail as below.

Figure 4:
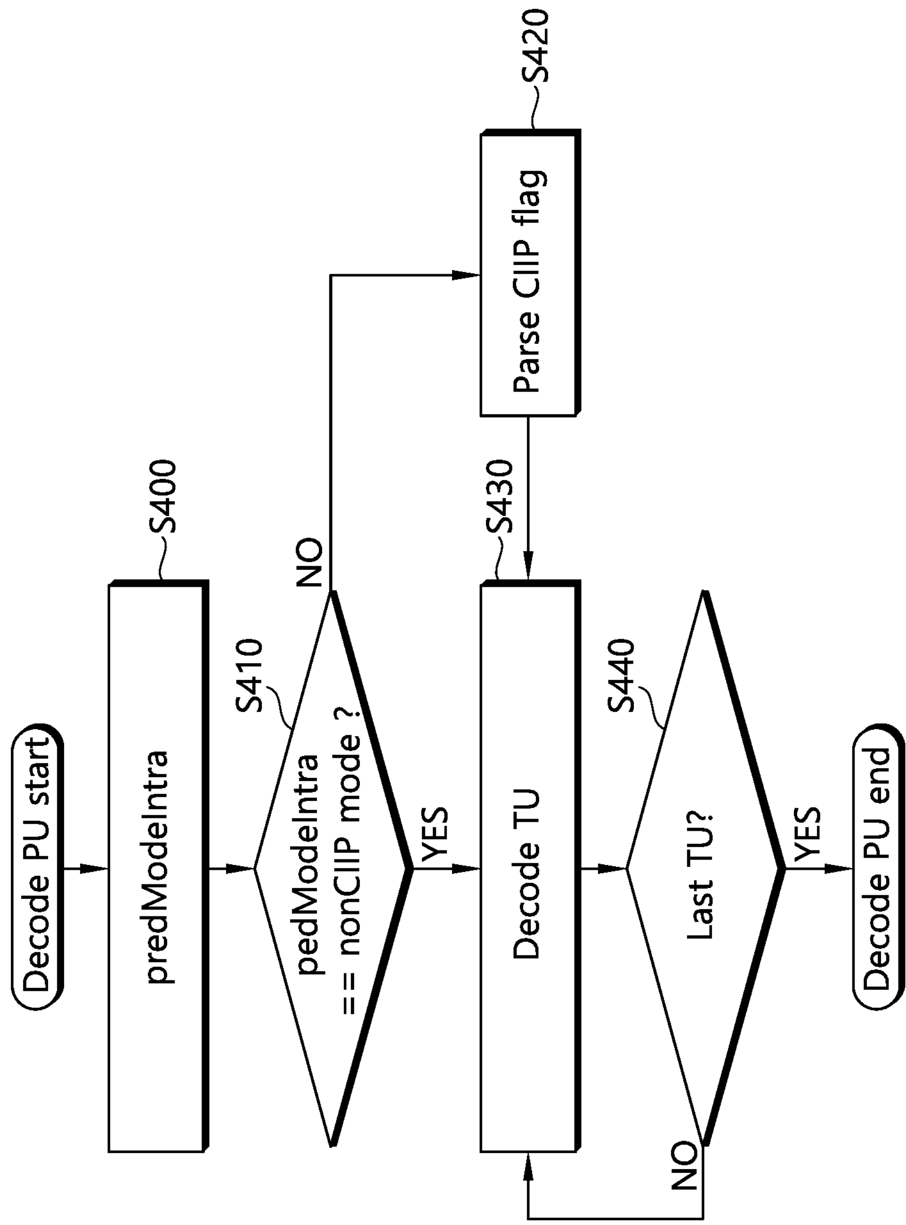
FIG. 4 illustrates a PU decoding procedure according to the present invention.

FIG. 4 illustrates a PU decoding procedure according to the present invention. The procedure shown in FIG. 4 may be performed by a decoding device. The current block described above may correspond to a TU, for example.

Referring to FIG. 4, the decoding device determines an intra prediction mode (step, S400). The decoding device may determine the intra prediction mode according to whether most probable mode (MPM) or remaining mode is applied. Here, the intra prediction mode may be one of a DC mode, a planar mode or angular modes.

In the case that the MPM mode is applied, an MPM list may be determined based on the intra prediction mode for the left or top neighboring block of the PU, and the intra prediction mode may be determined based on the MPM list. In this case, for example, in the case that the left or top neighboring block is not available (e.g., the left or top neighboring block is located outside of a picture) or the left or top neighboring block is coded in an inter prediction mode, the intra prediction mode for the left or top neighboring block may be set as the DC mode. Alternatively, in the case that the remaining mode is applied, among the remaining modes that are not included in the MPM list, the information indicating a specific intra prediction mode may be signaled.

The decoding device checks whether the intra prediction mode corresponds to a non-CIIP mode (step, S410). For example, as described below, it may be configured that the CIIP mode is not applied to a part of the intra prediction modes, and this may be called the non-CIIP mode. Meanwhile, in the case that the non-CIIP mode is set, step S410 may be omitted.

In the case that the determined intra prediction mode is not belonged to the non-CIIP mode, the decoding device parses and checks a CIIP flag (step, S420). The decoding device determines whether the CIIP is applied to a TU based on the CIIP flag, and decodes the TU (step, S430). In the case that the CIIP is applied, the decoding device applies the CIIP scaling procedure for transform coefficients of a neighboring block of the TU as described above and derives a modified neighboring sample, and generates a prediction sample according to the determined intra prediction mode based on the modified neighboring sample. In the case that the CIIP is not applied, the decoding device derives a neighboring sample without the CIIP scaling procedure based on the neighboring coefficients of the neighboring block of the TU, and generates a prediction sample according to the determined intra prediction mode based on the neighboring sample.

The decoding device checks whether the TU is the last TU in the PU area (step, S440). As an example, in the case that a single TU is existed in the PU area, the TU may be the last TU. As another example, in the case that a plurality of TUs (e.g., four TUs) is existed in the PU area, according to a predefined scan order (e.g., raster scan order), the lastly decoded TU among the TUs may be the last TU.

In the case that the TU is the last TU in the PU area, the decoding device may terminate the PU decoding procedure. In the case that the TU is not the last TU in the PU area, the decoding device decodes the next TU.

Meanwhile, although it is shown that it may be determined whether to apply the CIIP to the TUs in the PU according to one CIIP flag in FIG. 4, this is just an example, but whether to apply the CIIP may be indicated separately for each TU in the PU.

In the meanwhile, the TU decoding procedure described above may be performed as below, for example.

Figure 5:
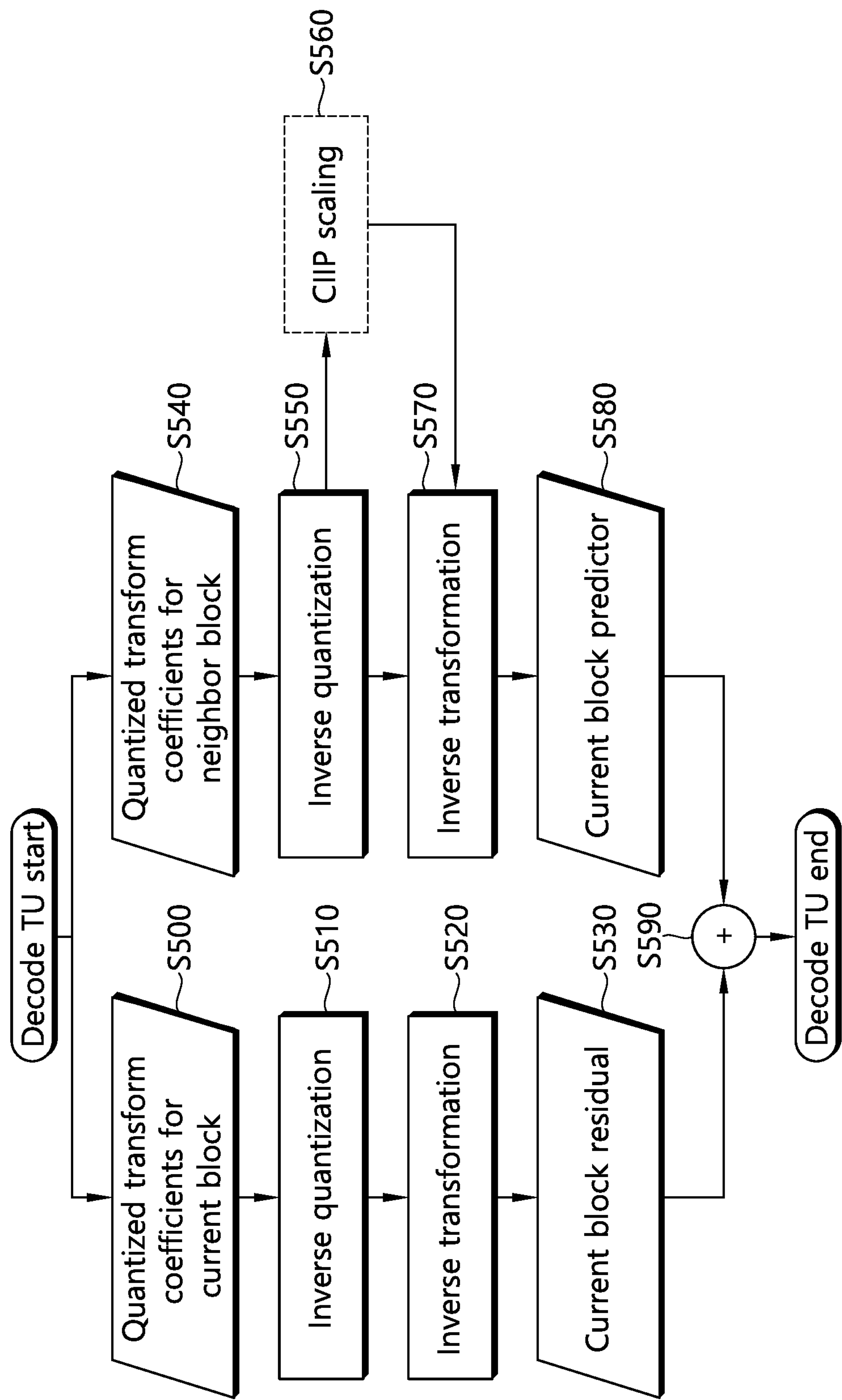
FIG. 5 illustrates a TU decoding procedure according to the present invention.

FIG. 5 illustrates a TU decoding procedure according to the present invention. The procedure of FIG. 5 may be performed by a decoding device. In FIG. 5, a current block may correspond to a TU.

Referring to FIG. 5, the decoding device obtains quantized transform coefficients for a current block (step, S550). The decoding device may obtain the quantized transform coefficients from bitstream.

The decoding device may inversely quantize the quantized transform coefficients (step, S510) and derive transform coefficients for the current block, and inversely transform the transform coefficients for the current block (step, S520) and obtain residual samples for the current block (step, S530).

Meanwhile, the decoding device obtains quantized transform coefficients for a neighboring block (step, S540). The decoding device may obtain the quantized transform coefficients for the neighboring block from the bitstream.

The decoding device inversely quantizes the quantized transform coefficients for the neighboring block (step, S550) and derives the transform coefficients for the neighboring block. In the case that the CIIP is applied to the current block, the CIIP scaling procedure is applied to the transform coefficients for the neighboring block (step, S560), and the CIIP scaled transform coefficients is inversely transformed (step, S570) and modified residual samples for the neighboring block may be obtained. Based on the modified residual samples, the modified neighboring samples for the current block may be derived as reference samples, and based on the reference samples, the prediction samples for the current block may be obtained (step, S580).

In the case that the CIIP is not applied to the current block, step S560 procedure may be omitted, and then the transform coefficients for the neighboring block may be inversely transformed (step, S570), and modified residual samples for the neighboring block may be obtained. In this case, based on the residual samples for the neighboring block, the neighboring samples for the current block may be derived as reference samples, and based on the reference samples, the prediction samples for the current block may be obtained (step, S580).

The dequantizing, the CIIP scaling and/or the inverse transform procedure performed based on the quantized transform coefficients for the neighboring block may be performed based in the information of the neighboring block. For example, in the case that the current block is a TU of 8×8 size and the neighboring block is a TU of 4×4 size, the dequantizing, the CIIP scaling and/or the inverse transform procedure performed based on the quantized transform coefficients for the neighboring block may be performed for the TU of 4×4 size.

The decoding device may generate reconstructed samples for the current block based on the residual samples for the current block and the prediction samples for the current block (step, S590). In this case, the decoding device may generate the reconstructed samples by adding the residual samples for the current block to the prediction samples for the current block depending on a position or a phase.

Meanwhile, the procedure for generating the prediction samples for the current block described above may be performed as below in detail, for example.

Figure 6:
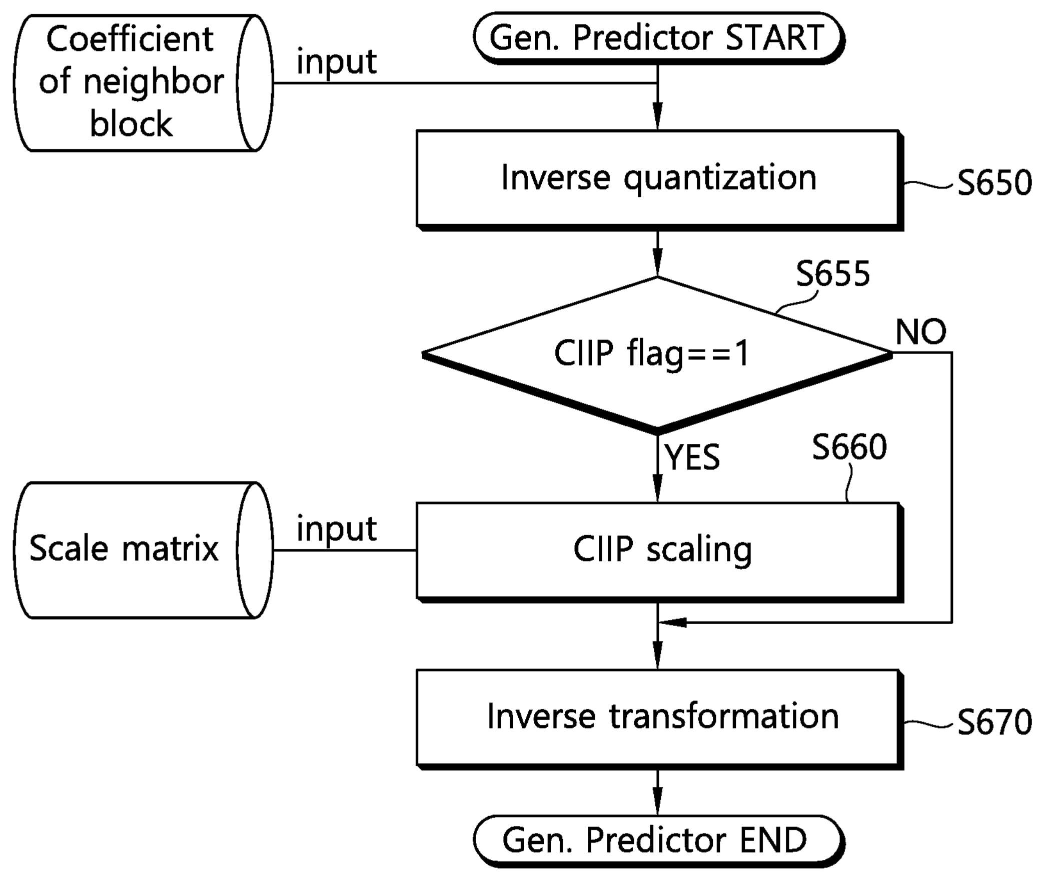
FIG. 6 illustrates a procedure for generating a prediction sample for a current block according to the present invention.

FIG. 6 illustrates a procedure for generating a prediction sample for a current block according to the present invention.

Referring to FIG. 6, a decoding device obtains quantized transform coefficients of a neighboring block, and obtains transform coefficients by inversely transforming the quantized transform coefficients (step, S650).

The decoding device checks whether the CIIP is applied to a current block (step, S655). It may be determined whether the CIIP is applied based on a CIIP flag. When the CIIP flag value is 1, this may represent the CIIP is applied to the current block, and when the CIIP flag value is 0, this may represent the CIIP is not applied to the current block.

In the case that the CIIP is applied to the current block, the CIIP scaling procedure is applied to the transform coefficients (step, S660). The CIIP scaling procedure may be performed based on a predetermined scaling matrix as described above.

The decoding device inversely transforms CIIP scaled transform coefficients (in the case that the CIIP is applied) or transform coefficients (in the case that the CIIP is not applied), and obtains (modified) residual samples for the neighboring block (step, S670). Based on the prediction samples of the neighboring block and the residual samples for the neighboring block, which are obtained according to a prediction mode of the neighboring block, the decoding device may generate (modified) constructed samples of the neighboring block, and may derive (modified) neighboring samples of the current block based on the (modified) constructed samples. The (modified) constructed samples may be utilized as reference samples for intra prediction of the current block.

In this case, as described above, it may be determined whether the CIIP is applied in a PU unit or a TU unit. In this case, the CIIP flag may be signaled in the PU unit or the TU unit.

For example, the CIIP flag may be included in PU syntax. In this case, the PU syntax may include the syntax elements as below, for example.

TABLE 1

```
if( CuPredMode[ x0 ][ y0 ]  = =  MODE_INTRA ) {
  if( PartMode  = =  PART_2N×2N  &&  pcm_enabled_flag  &&
    log2CbSize  >=  Log2MinIpcmCbSizeY &&
    log2CbSize  <=  Log2MaxIpcmCbSizeY )
    pcm_flag[ x0 ][ y0 ]
  if( pcm_flag[ x0 ][ y0 ] ) {
    while( !byte_aligned( ) )
      pcm_alignment_zero_bit
    pcm_sample( x0, y0, log2CbSize )
  } else {
    pbOffset = ( PartMode  = =  PART_N×N ) ? ( nCbS / 2 ) : nCbS
    for( j = 0; j < nCbS; j = j + pbOffset )
      for( i = 0; i < nCbS; i = i + pbOffset )
        prev_intra_luma_pred_flag[ x0 + i ][ y0 + j ]
    for( j = 0; j < nCbS; j = j + pbOffset )
      for( i = 0; i < nCbS; i = i + pbOffset )
        if( prev_intra_luma_pred_flag[ x0 + i ][ y0 + j ] )
          mpm_idx[ x0 + i ][ y0 + j ]
        else
          rem_intra_luma_pred_mode[ x0 + i ][ y0 + j ]
    for( j = 0; j < nCbS; j = j + pbOffset )
      for( i = 0; i < nCbS; i = i + pbOffset )
        if( IntraPredModeY[ x0 + i ][ y0 + j ] !=
        NON_CIIP_PRED_MODE_INTRA )
          ciip_flag[ x0 + i ][ y0 + j ]
    intra_chroma_pred_mode[ x0 ][ y0 ]
  }
}
```

Herein, ciip_flag syntax elements correspond to the CIIP flag described above. IntraPredModeY represents an intra prediction mode of the current block, and particularly, represents an intra prediction mode for luma component of the current block. NON_CIIP_PRED_MODE_INTRA corresponds to the non-CIIP prediction mode. That is, in the case that it is configured that the CIIP mode is not applied to a part of intra prediction modes, the NON_CIIP_PRED_MODE_INTRA represents the intra prediction mode which is configured that the CIIP mode is not applied.

As described above in the table, in the case that the intra prediction mode of the current block is not the non-CIIP prediction mode, the intra prediction mode of the current block may be included in the PU syntax. In other words, the decoding device may parse the ciip_flag syntax elements only in the case that the intra prediction mode of the current block is not the non-CIIP prediction mode. Alternatively, in order to reduce complexity, the ciip_flag syntax elements may be included in the PU syntax always.

Meanwhile, according to the present invention, based on the information for the residual signal of the neighboring block of a current PU, the CIIP flag may be derived. The residual signal may include the information for residual samples. As described above, during the procedure of generating prediction samples of the current block using the residual signal of the neighboring block, an error between the prediction sample and the original sample of the current block is minimized by applying the CIIP scaling matrix, thereby increasing intra prediction performance. Accordingly, in the case that the CIIP mode is applied, the residual signal of the neighboring block may be generated by applying a scaling matrix. However, in the case that the neighboring block has a specific property in relation to the quantization and the like, for example, in the case that there is no quantized transform coefficients of the neighboring block or all of the values are zero, there is no influence on the output value even in the case that the CIIP scaling is applied. Accordingly, in the case that the current block performs intra prediction based on such a neighboring block, an encoding device may derive the CIIP flag as zero internally or implicitly, not transmitting the CIIP flag to the decoding device. That is, in a specific situation, the decoding device may not parse the CIIP flag, and in this case, the decoding device may derive the CIIP flag value as zero.

Figure 7:
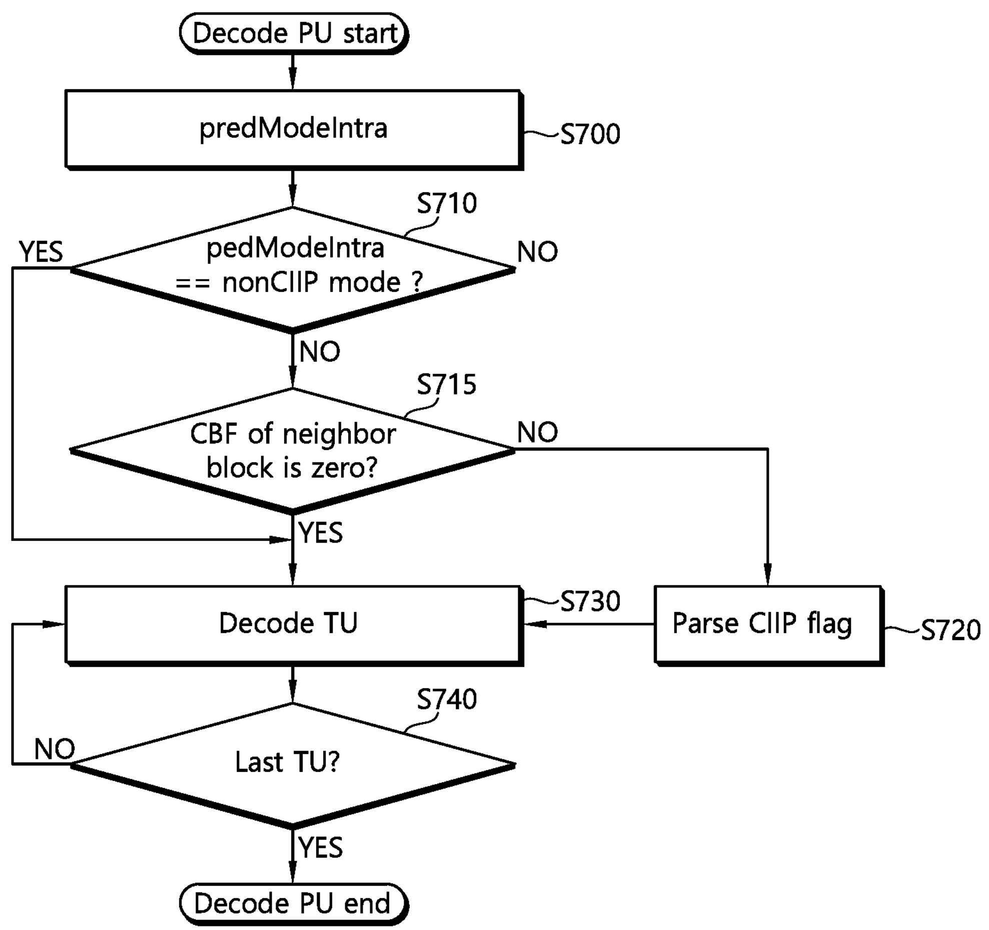
FIG. 7 illustrates a method for deriving a CIIP flag when performing PU decoding according to the present invention.

FIG. 7 illustrates a method for deriving a CIIP flag when performing PU decoding according to the present invention.

Referring to FIG. 7, a decoding device determines an intra prediction mode (step, S700). Here, the intra prediction mode may be one of a DC mode, a planar mode or angular modes.

The decoding device checks whether the intra prediction mode corresponds to the non-CIIP mode (step, S710). Meanwhile, in the case that the non-CIIP mode is not set, step S710 procedure may be omitted.

In the case that the determined intra prediction mode is not belonged to the non-CIIP mode, the decoding device checks whether a coded bit flag (CBF) of a neighboring block of the current PU is zero (step, S715). For example, when the CBF is 1, this may represent that the corresponding TU includes one or more transform coefficient levels which are not equal to zero. The CBF may correspond to cbf_luma syntax element. Here, the neighboring block may be one of neighboring block located in left, top, top-left, bottom-left or top-right side of the current PU, for example. For example, the neighboring block may be a specific neighboring block among the neighboring blocks. The specific neighboring block may be determined according to the intra prediction mode as described below, for example.

When the CBF of the neighboring block is non-zero, the decoding device parses and checks a CIIP flag (step, S720). The decoding device may determine whether the CIIP is applied to the TU based on the CIIP flag, and decode the TU (step, S730). In the case that the CIIP is applied, the decoding device derives a modified neighboring sample by applying the CIIP scaling procedure to the transform coefficients of the neighboring block of the TU, and generates a prediction sample according to the determined intra prediction mode based on the modified neighboring sample. In the case that the CIIP is not applied (in the case that the determined intra prediction mode belongs to the non-CIIP mode, in the case that the CBF of the neighboring block is zero or in the case that the CIIP flag value is zero), the decoding device derives a neighboring sample without the CIIP scaling procedure based on the transform coefficients of the neighboring block of the TU, and generates a prediction sample according to the determined intra prediction mode based on the neighboring sample.

The decoding device checks whether the TU is the last TU in the PU area (step, S740).

In the case that the TU is the last TU in the PU area, the decoding device may terminate the PU decoding procedure, and in the case that the TU is not the last TU in the PU area, the decoding device may decode the next TU, as described above.

Meanwhile, a plurality of neighboring blocks may be existed neighboring the PU, for example, the following neighboring blocks may be used for determining whether to apply the CIIP to the PU and/or TUs in the PU area.

Figure 8:
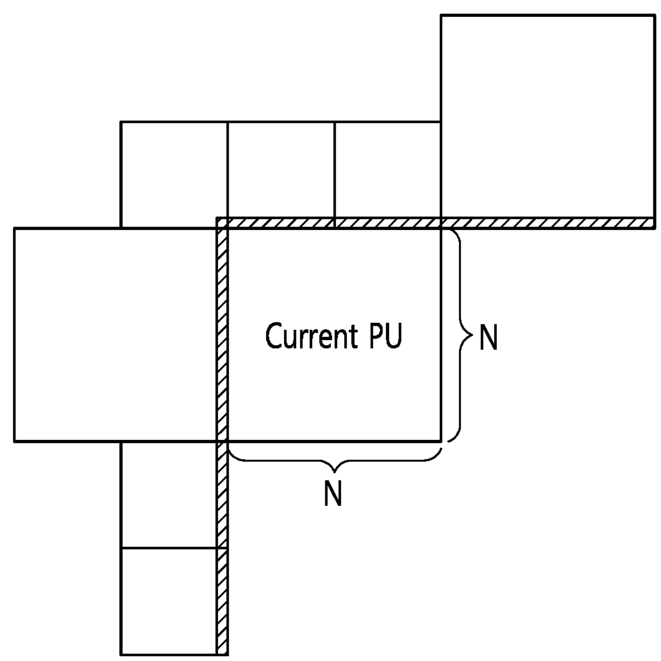
FIG. 8 illustrates neighboring blocks and neighboring reference samples based on a current PU.

FIG. 8 illustrates neighboring blocks and neighboring reference samples based on a current PU. Here, the neighboring reference samples are samples which are referred to determine whether the CIIP is applied to TUs in the current PU area, and correspond to the hatched area in FIG. 8. The neighboring reference samples may be the same as or different from the neighboring samples used for intra prediction of one or more TUs in the current PU area. For example, in the case that a TU of the same size as a size of the PU is existed in the current PU area, the neighboring reference samples may be the same as the neighboring samples of the TU. As another example, in the case that a plurality of TUs is existed in the current PU area, a part of the neighboring reference samples may be used for intra prediction of the TUs.

Referring to FIG. 8, in the case that a size of the current PU is N×N, total 2N+1 neighboring reference samples may be existed. In this case, when the CBF of the neighboring block that includes the neighboring reference sample is zero, it may be determined that the CIIP is not applied to the current PU. Here, the fact that the CIIP is not applied to the current PU may represent that the CIIP is not applied to one or more TUs in the current PU. Same as above. Accordingly, in this case, the decoding device may derive the CIIP flag value as zero without parsing or decoding the CIIP flag.

For example, particularly, in the case that all of the CBFs in the neighboring blocks that include the neighboring reference samples are zero, it may be configured or determined that the CIIP is not applied to the current PU. In addition, in the case that there is a CBF having value 1 among the CBFs of the neighboring blocks that include the neighboring reference samples, in order to determine whether to apply the CIIP to the current PU, the decoding device may parse or decode a CIIP flag.

As another example, among the neighboring blocks that include the neighboring reference samples of the current PU, only one or more neighboring blocks selected based on the intra prediction mode for the current PU may be used for determining whether to apply the CIIP to the PU and/or TUs in the PU area. That is, by considering the CBF of the block that includes samples of the positions referred for each intra prediction mode, it may be determined whether to apply the CIIP to the current PU. For example, the intra prediction mode may include total 35 prediction modes as below.

TABLE 2

| Intra prediction mode | Associated name |
|---|---|
| 0 | Intra planar |
| 1 | Intra DC |
| 2 . . . 34 | Intra angular2 . . . Intra angular34 |

Herein, intra prediction mode #0 indicates an intra planar mode, and intra prediction mode #1 indicates an intra DC mode. Intra prediction modes #2 to #34 indicate an intra angular2 mode to an intra angular34 mode, respectively.

Here, the intra planar mode and the intra DC mode may be called an intra non-directional mode, and the intra angular2 mode to the intra angular34 mode may be called an intra directional mode.

Figure 9:
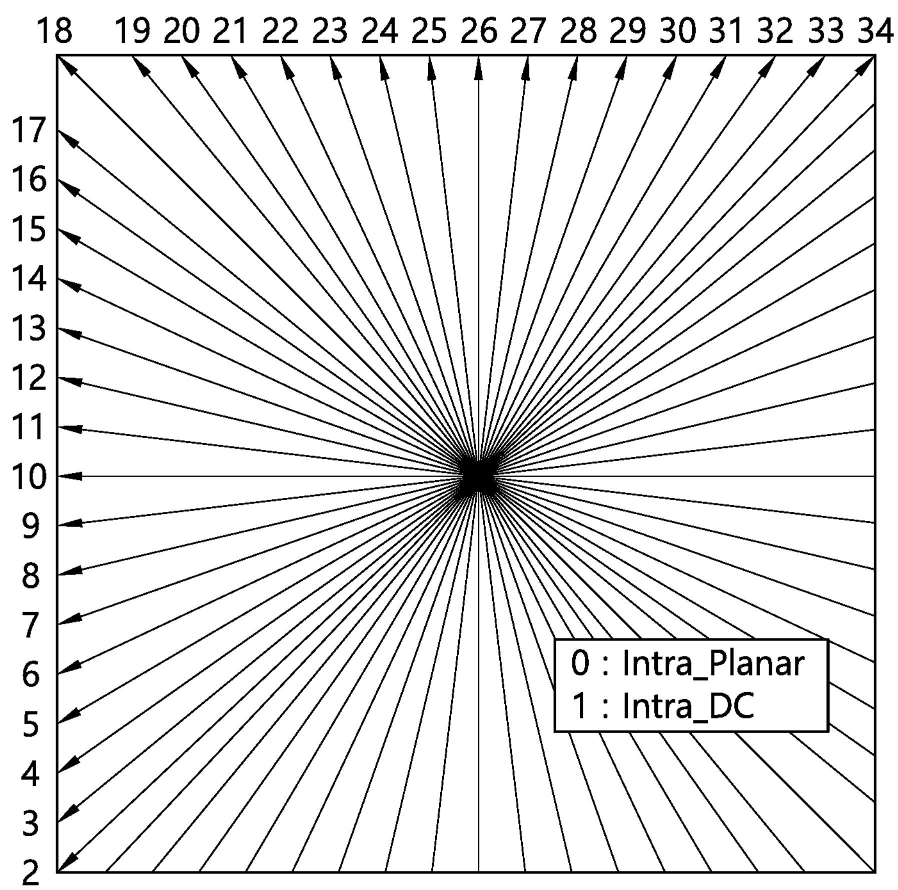
FIG. 9 illustrates intra prediction modes according to the present invention.

FIG. 9 illustrates intra prediction modes according to the present invention.

Referring to FIG. 9, intra prediction modes #0 and #1 do not have directionality, and a prediction sample may be derived based on a bidirectional interpolation of neighboring samples or an average value of neighboring samples. Meanwhile, intra prediction modes #2 and #34 have directionality, and the prediction sample may be derived based on the neighboring (reference) sample located in the corresponding prediction direction based on a position of the prediction sample. In this case, in the case that a neighboring sample of an integer sample unit is not existed in the corresponding prediction direction position, a fractional sample may be generated through an interpolation of two integer samples neighboring at the corresponding direction position, and the prediction sample may be derived based on the fractional sample.

Accordingly, the whole or only a specific part of the neighboring reference samples of the current PU may be considered according to the intra prediction mode.

Figure 10:
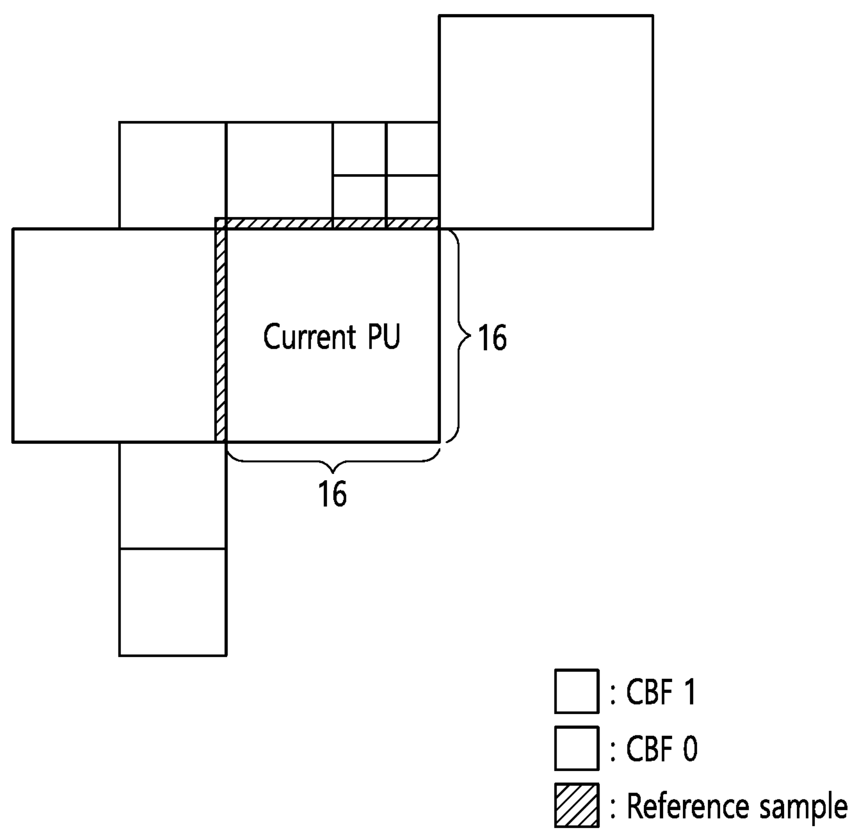
FIG. 10 illustrates an example of the case that there is a block of which CBF is 1 among the considered neighboring blocks in the case that an intra prediction mode of a current PU has a prediction direction of top-left diagonal direction (e.g., intra prediction mode #18).

FIG. 10 illustrates an example of the case that there is a block of which CBF is 1 among the considered neighboring blocks in the case that an intra prediction mode of a current PU has a prediction direction of top-left diagonal direction (e.g., intra prediction mode #18).

Referring to FIG. 10, a size of a current PU is 16×16 (sample unit), and the hatched area indicates neighboring reference samples which are considered when the intra prediction mode of the current PU has a prediction direction of top-left diagonal direction. In this case, only the neighboring blocks including the hatched area are considered for determining whether to apply the CIIP to the current PU. That is, in the case that all CBFs of neighboring blocks including the neighboring reference samples in the hatched area are zero, it may be determined that the CIIP is not applied to the current PU, and in the case that even one of CBFs of neighboring blocks including the neighboring reference samples in the hatched area is 1, it may be determined whether to apply the CIIP based on a CIIP flag.

In FIG. 10, since a part of the neighboring reference samples belongs to the block of which CBF is 1, the CIIP is available for intra prediction for the TUs in the current PU area, and the CIIP flag is identified, and based on it, it may be determined whether to apply the CIIP to the current PU.

Figure 11:
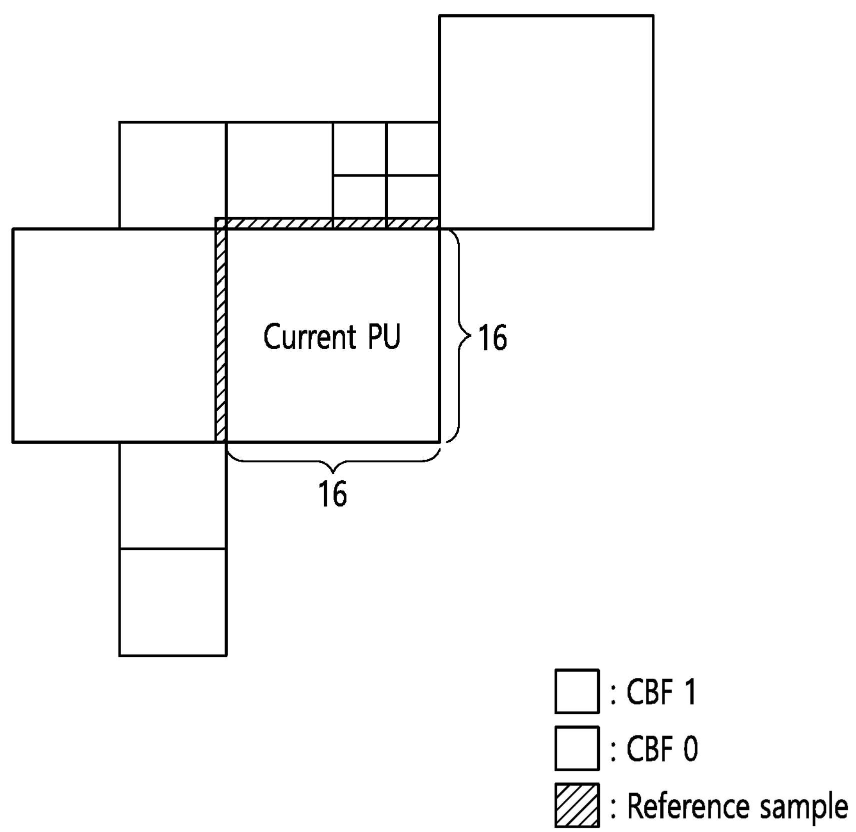
FIG. 11 illustrates an example of the case that there is no block of which CBF is 1 among the considered neighboring blocks in the case that an intra prediction mode of a current PU has a prediction direction of top-left diagonal direction.

Meanwhile, FIG. 11 illustrates an example of the case that there is no block of which CBF is 1 among the considered neighboring blocks in the case that an intra prediction mode of a current PU has a prediction direction of top-left diagonal direction.

Referring to FIG. 11, a size of a current PU is 16×16 (sample unit), and the hatched area indicates neighboring reference samples which are considered when the intra prediction mode of the current PU has a prediction direction of top-left diagonal direction. Since all of the neighboring reference samples belong to the block of which CBF is zero, the CIIP is not available for intra prediction for the TUs in the current PU area, and accordingly, without identifying the CIIP flag, the decoding device may determine that the CIIP is not applied to the current PU.

As described above, in the case that blocks of various sizes are existed neighboring the current PU and a prediction sample is generated by utilizing an intra prediction mode, it may be determined whether the CIIP is applied by considering the CBF of the reference blocks only, which are located in an area of a predetermined category according to the intra prediction mode. In this case, the reference blocks considered according to the intra prediction mode may be set as below, for example.

TABLE 3

| Category | Intra prediction mode | CBF reference block position |
|---|---|---|
| Category 0 | 14 . . . 22 | B, C, D |
| Category 1 | 8 . . . 13 | B |
| Category 2 | 23 . . . 28 | D |
| Category 3 | 2 . . . 7 | A, B |
| Category 4 | 29 . . . 34 | D, E |
| Category 5 | 0 | A, B, C, D, E |

As represented in the table, by being classified into six categories according to each intra prediction mode, the intra prediction mode belonged to each category considers the CBF of the reference block existed in the corresponding CBF reference block position. Meanwhile, intra prediction mode #1 may belongs to category 5, for example. As another example, in the case that intra prediction mode #1 is selected, it may be determined that the CIIP is not applied. In this case, intra prediction mode #1 may be set as a non-CIIP prediction mode.

Among A, B, C, D and E representing the CBF reference block positions, for example, A may correspond to a bottom-left area of the current PU, B may correspond to a left area of the current PU, C may correspond to a top-left area of the current PU, D may correspond to a top area of the current PU, and E may correspond to a top-right area of the current PU.

Figure 12:
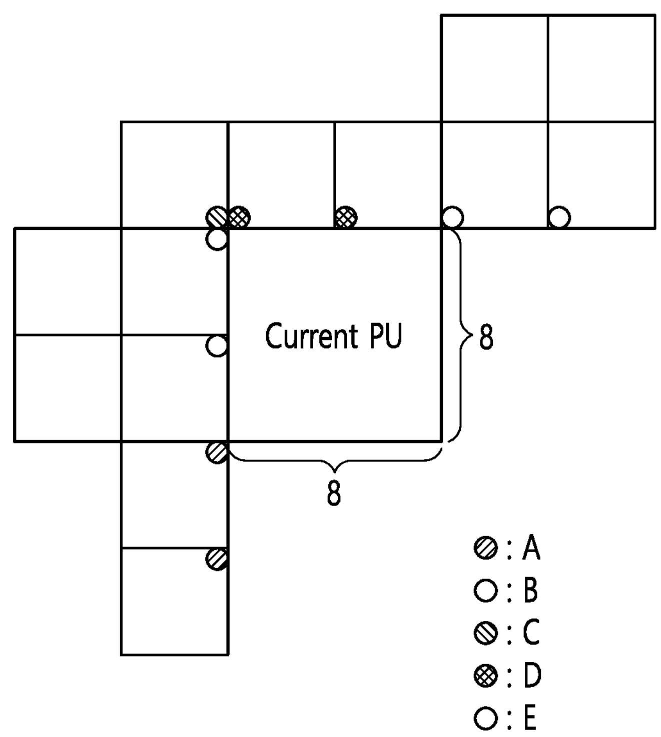
FIG. 12 illustrates a CBF reference block position.

FIG. 12 illustrates a CBF reference block position.

Referring to FIG. 12, a size of a current PU is 8×8, and among A, B, C, D and E representing the CBF reference block positions, for example, A corresponds to a bottom-left area of the current PU, B corresponds to a left area of the current PU, C corresponds to a top-left area of the current PU, D corresponds to a top area of the current PU, and E corresponds to a top-right area of the current PU.

Particularly, for example, in the case that the top-left sample position of the current PU is (0,0), a height of the current PU is H and a width of the current PU is W, A may represent an area on which the reference samples of (−1,H) to (−1,2H−1) positions are located, B may represent an area on which the reference samples of (−1,0) to (−1,H−1) positions are located, C may represent an area on which the reference sample of (−1,−1) position is located, D may represent an area on which the reference samples of (0,−1) to (W−1,−1) positions are located, and E may represent an area on which the reference samples of (W,−1) to (2 W−1, −1) positions are located.

The CBF reference block position according to a particular category may be represented as below, for example.

Figure 13:
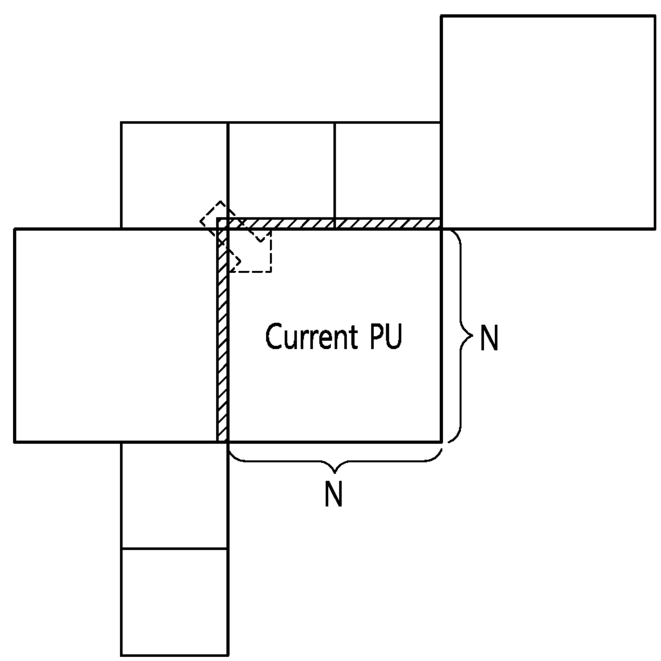
FIG. 13 illustrates an example of reference samples when an intra prediction mode of a current PU belongs to category 0.

FIG. 13 illustrates an example of reference samples when an intra prediction mode of a current PU belongs to category 0.

Referring to FIG. 13, in the case that the intra prediction mode of the current PU belongs to category 0, that is, in the case that the intra prediction mode of the current PU is one of 14 to 22, based on the CBF of the reference blocks located in B, C and D areas, it may be determined whether the CIIP is applied to the current PU. In this case, the B, C and D areas may correspond to the hatched area of FIG. 13. A decoding device may derive the CIIF flag as zero in the case that all of the CBFs of the reference block TU located in the hatched area are zero. And, in the case that even one of the CBFs of the reference block TU located in the hatched area is non-zero, an encoding device transmits a CIIP flag to the decoding device, and the decoding device determines whether to apply the CIIP to the current PU based on the CIIP flag.

Figure 14:
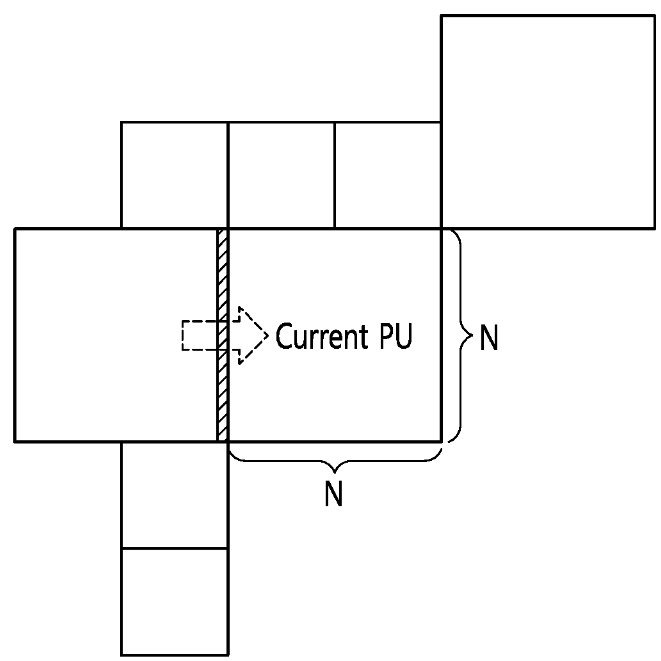
FIG. 14 illustrates an example of reference samples when an intra prediction mode of a current PU belongs to category 1.
Figure 15:
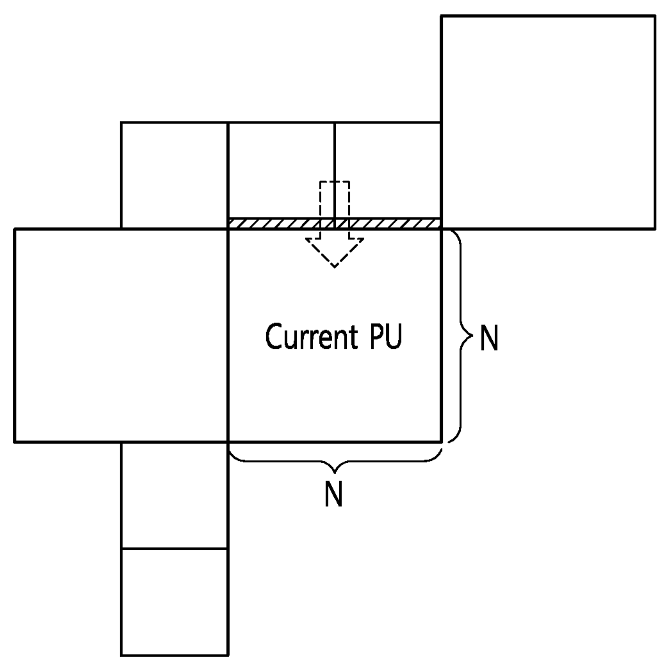
FIGS. 15 to 18 illustrate examples of reference samples when an intra prediction mode of a current PU belongs to categories 2 to 5, respectively.
Figure 16:
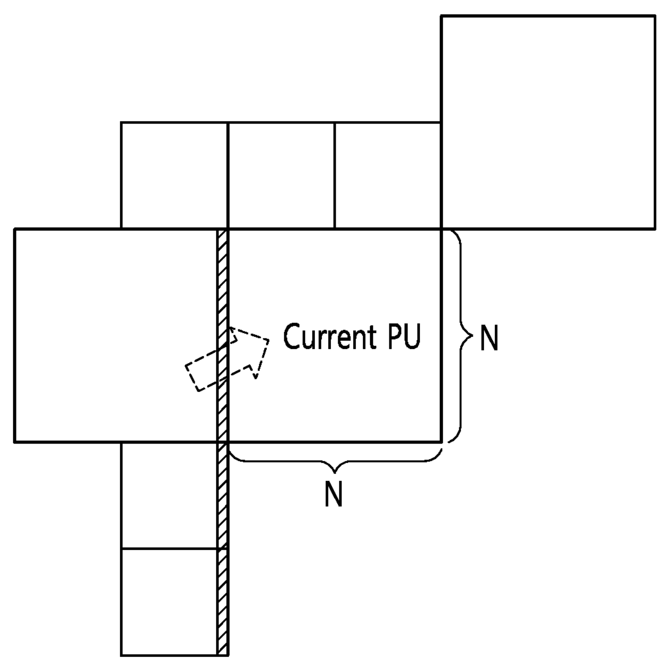
Figure 17:
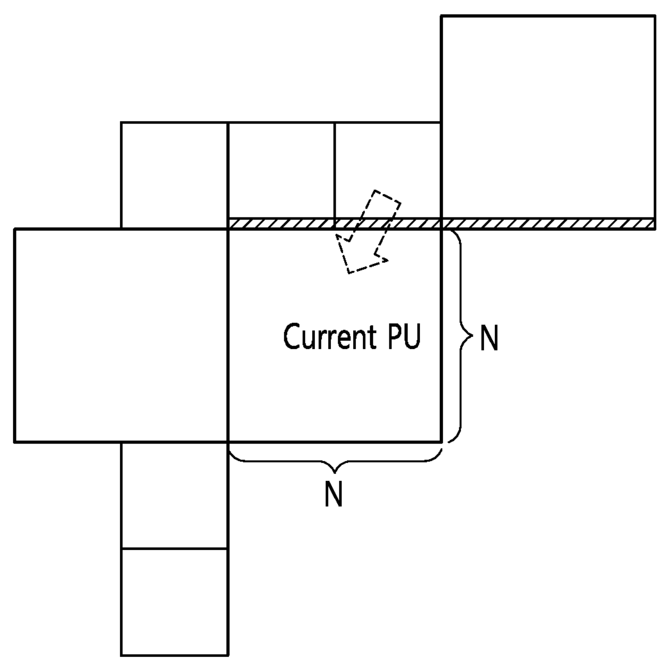
Figure 18:
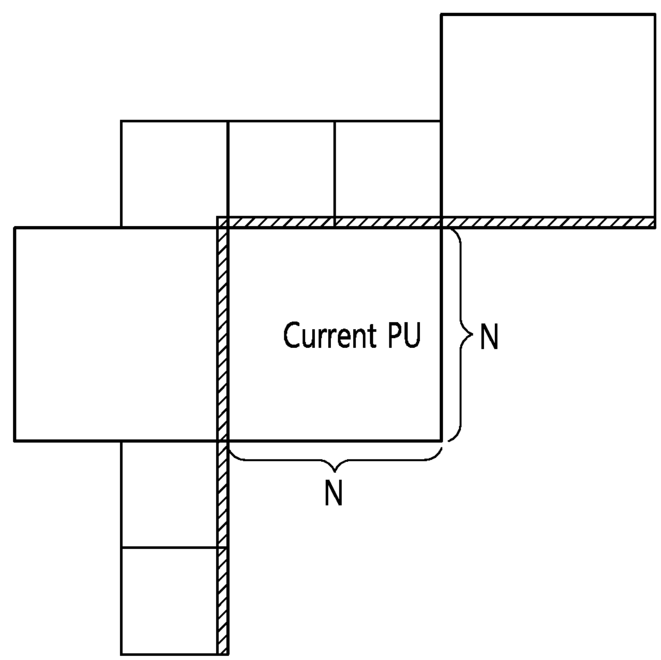

FIG. 14 illustrates an example of reference samples when an intra prediction mode of a current PU belongs to category 1.

Referring to FIG. 14, in the case that the intra prediction mode of the current PU belongs to category 1, based on the CBF of one or more reference blocks located in B area, it may be determined whether the CIIP is applied to the current PU. In this case, the B area may correspond to the hatched area of FIG. 14. A decoding device may derive the CIIF flag as zero in the case that all of the CBFs of the reference block TU located in the hatched area are zero. And, in the case that even one of the CBFs of the reference block TU located in the hatched area is non-zero, an encoding device transmits a CIIP flag to the decoding device, and the decoding device determines whether to apply the CIIP to the current PU based on the CIIP flag.

FIGS. 15 to 18 illustrate examples of reference samples when an intra prediction mode of a current PU belongs to categories 2 to 5, respectively.

As shown in FIG. 15 to FIG. 18, in the case that the intra prediction mode of the current PU belongs to category 2, based on the CBF of one or more reference blocks located in D area, it may be determined whether the CIIP is applied to the current PU. In the case that the intra prediction mode of the current PU belongs to category 3, based on the CBF of one or more reference blocks located in A and B areas, it may be determined whether the CIIP is applied to the current PU. In the case that the intra prediction mode of the current PU belongs to category 4, based on the CBF of one or more reference blocks located in D and E areas, it may be determined whether the CIIP is applied to the current PU. In the case that the intra prediction mode of the current PU belongs to category 5, based on the CBF of the reference blocks located in A, B, C, D and E areas, it may be determined whether the CIIP is applied to the current PU. Here, the hatched area of each of the drawings may correspond to the respective CBF reference area according to each category, as described above.

Meanwhile, a PU is partitioned from a CU, and may have a non-square shape depending on a partitioning mode (or type). Even in the case that a current PU is partitioned into a non-square shape, only a part of the considered reference area is different, and it may be determined whether the CIIP is applied to the current PU based on the CBF of the reference blocks according to the same method.

Figure 19:
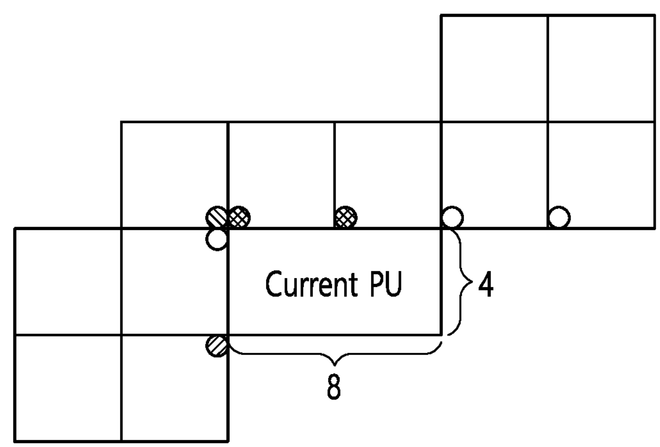
FIG. 19 illustrates positions of reference blocks for a current PU of a non-square shape.

FIG. 19 illustrates positions of reference blocks for a current PU of a non-square shape. In FIG. 19, a partition type of the current PU may be PART_2N×N.

Referring to FIG. 19, a height of the current PU is H, a width of the current PU is W, and H and W are 4 and 8, respectively, which are different. In this case, among A, B, C, D and E representing the CBF reference block positions, for example, A corresponds to a bottom-left area of the current PU, B corresponds to a left area of the current PU, C corresponds to a top-left area of the current PU, D corresponds to a top area of the current PU, and E corresponds to a top-right area of the current PU.

Particularly, for example, in the case that the top-left sample position of the current PU is (0,0), A may represent an area on which the reference samples of (−1,H) to (−1, 2H−1) positions are located, B may represent an area on which the reference samples of (−1,0) to (−1,H−1) positions are located, C may represent an area on which the reference sample of (−1,−1) position is located, D may represent an area on which the reference samples of (0,−1) to (W−1,−1) positions are located, and E may represent an area on which the reference samples of (W,−1) to (2 W−1, −1) positions are located.

Figure 20:
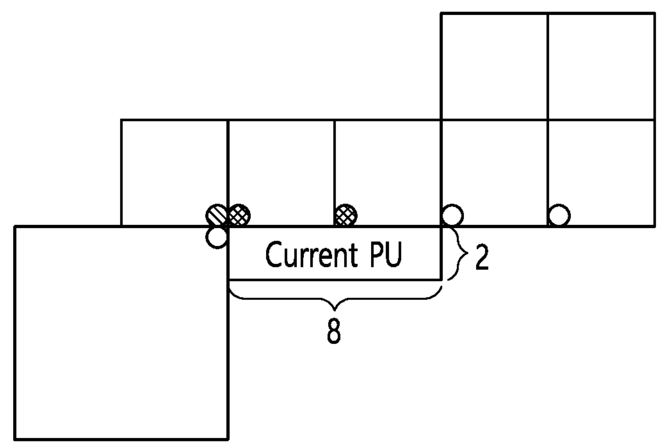
FIGS. 20 and 21 illustrate positions of reference samples for a current PU of a non-square shape.
Figure 21:
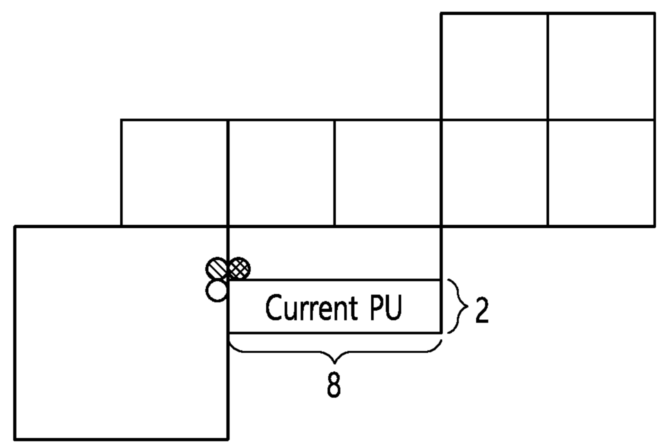

FIGS. 20 and 21 illustrate positions of reference samples for a current PU of a non-square shape. In FIG. 20 and FIG. 21, a partition type of the current PU may be PART_2N×nU. Particularly, FIG. 20 shows the case that a partition index of the current PU is zero, and FIG. 21 shows the case that a partition index of the current PU is 1.

Referring to FIG. 20 and FIG. 21, even in the case that the current PU has a non-square shape, it may be determined whether to apply the CIIP based on the reference blocks on the corresponding reference area according to an intra prediction mode. In FIG. 21, the neighboring block located in a top-right E area of the current PU is still not decoded according to a raster scan order, and accordingly, the neighboring block of E area is not available. In this case, the neighboring block of E area which is not available may be excluded from the reference block for determining whether to apply the CIIP.

Meanwhile, it may be determined whether to apply the CIIP to the PU and/or TUs in the PU area by considering whether to apply the CIIP to one or more reference blocks which are determined according to the intra prediction mode for the current PU among the neighboring blocks including the neighboring reference samples of the current PU. CIIP scaling matrix may be determined according to the intra prediction mode. In this case, whether to apply the CIIP to the current PU may be determined according to whether the reference block is a block to which the CIIP is already applied and reconstructed. That is, in generating reconstructed samples of a reference block, in the case that the CIIP scaling procedure is already applied, it may be identified that an error between the reconstructed samples and original samples of the reference block may be minimized, and in this case, the CIIP application may be unnecessary when performing intra prediction of the TUs in the current PU area based on the reference block. Accordingly, a decoding device may derive a CIIP flag of the current PU based on the CIIP flag of the reference block according to the intra prediction mode of the current PU.

Figure 22:
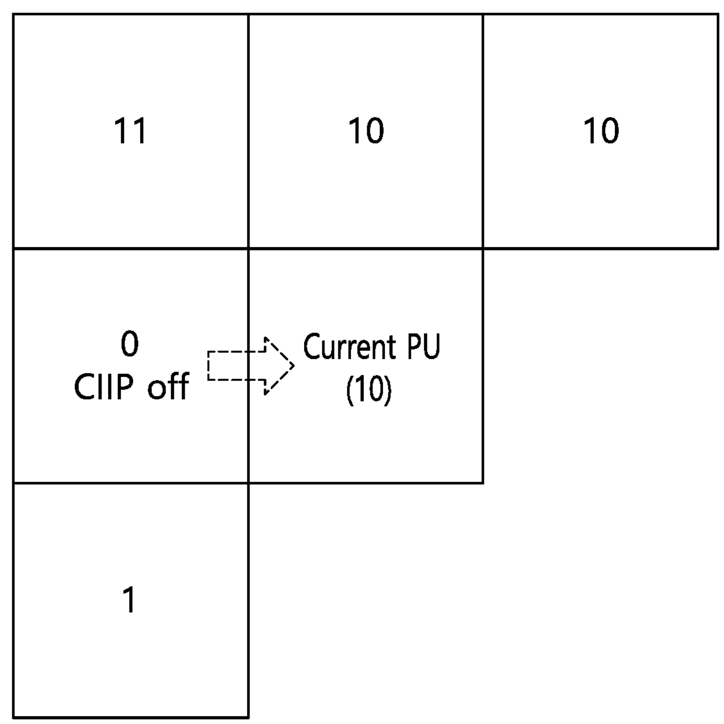
FIG. 22 illustrates an example of the case that a CIIP flag of a reference block is zero.

FIG. 22 illustrates an example of the case that a CIIP flag of a reference block is zero.

Referring to FIG. 22, an intra prediction mode index of the current PU is 10. In this case, a reference block is located on a left side of the PU. A decoding device identifies the CIIP flag of the reference block, and in the case that the CIIP flag of the reference block is zero, the decoding device parses and obtains the CIIP flag for the current PU. In this case, the decoding device may determine whether to apply the CIIP to the current PU based on the CIIP flag for the current PU.

Figure 23:
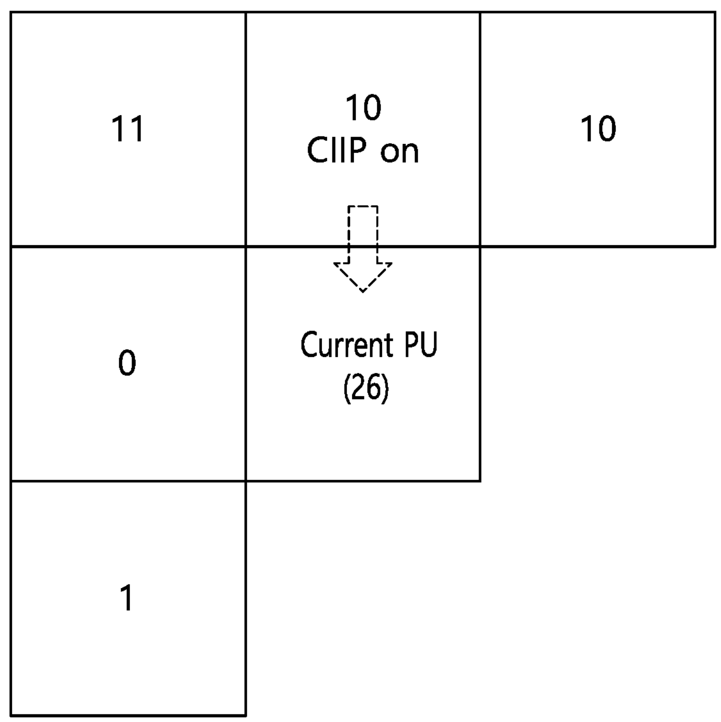
FIG. 23 illustrates an example of the case that a CIIP flag of a reference block is 1.

FIG. 23 illustrates an example of the case that a CIIP flag of a reference block is 1.

Referring to FIG. 23, an intra prediction mode index of the current PU is 26. In this case, a reference block is located on a top side of the PU. A decoding device identifies the CIIP flag of the reference block, and in the case that the CIIP flag of the reference block is 1, the decoding device derives the CIIP flag for the current PU as zero. That is, in this case, an encoding device does not transmit the CIIP flag for the current PU to the decoding device, and the decoding device derives the CIIP flag value as zero without parsing the CIIP flag for the current PU.

Meanwhile, a plurality of reference blocks may be existed in a prediction direction according to the intra prediction mode of the current PU.

Figure 24:
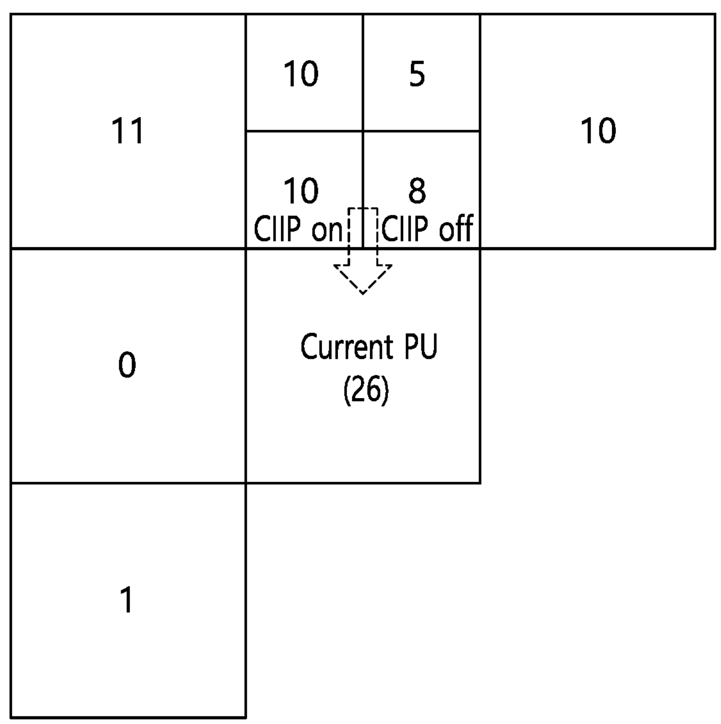
FIG. 24 illustrates an example of the case that a plurality of reference blocks is existed.

FIG. 24 illustrates an example of the case that a plurality of reference blocks is existed.

Referring to FIG. 24, blocks of various sizes may be existed neighboring a current PU, and an intra prediction mode index of the current PU is 26. And, two reference blocks may be located on a top side of the PU, and in this case, CIIP flags of the reference blocks may have different values. That is, a CIIP flag of a reference block may be zero, but a CIIP flag of another reference block may be 1.

In this case, intra prediction modes may be classified according to a predetermined category, and one or more reference blocks on a position that corresponds to the corresponding category are considered according to a priority, and accordingly, a CIIP flag for the current PU may be derived.

First, it may be considered the reference blocks located on an area of a predetermined category according to the intra prediction mode. In this case, the reference blocks considered according to the intra prediction mode may be configured as below, for example.

TABLE 4

| Category | Intra prediction mode | Reference block position |
|---|---|---|
| Category 0 | 0, 1 | A |
| Category 1 | 2 . . . 6 | B |
| Category 2 | 7 . . . 13 | C |
| Category 3 | 14 . . . 22 | A |
| Category 4 | 23 . . . 29 | D |
| Category 5 | 30 . . . 34 | E |

Among A, B, C, D and E representing the CBF reference block positions, for example, A may correspond to a bottom-left area of the current PU, B may correspond to a left area of the current PU, C may correspond to a top-left area of the current PU, D may correspond to a top area of the current PU, and E may correspond to a top-right area of the current PU.

Figure 25:
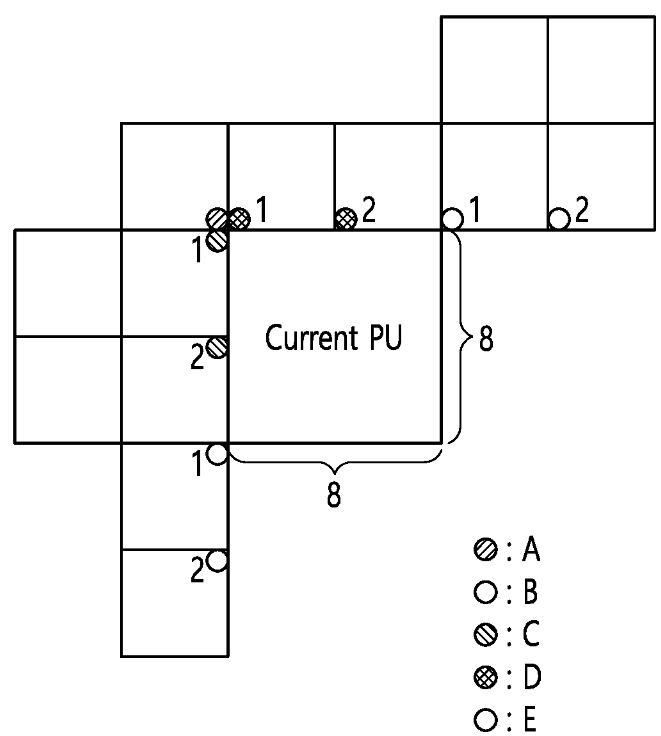
FIG. 25 illustrates a CBF reference block position.

FIG. 25 illustrates a CBF reference block position.

Referring to FIG. 25, a size of a current PU is 8×8, and among A, B, C, D and E representing the CBF reference block positions, for example, A corresponds to a bottom-left area of the current PU, B corresponds to a left area of the current PU, C corresponds to a top-left area of the current PU, D corresponds to a top area of the current PU, and E corresponds to a top-right area of the current PU.

Particularly, for example, in the case that the top-left sample position of the current PU is (0,0), a height of the current PU is H and a width of the current PU is W, A may represent an area on which the reference samples of (−1,H) to (−1,2H−1) positions are located, B may represent an area on which the reference samples of (−1,0) to (−1,H−1) positions are located, C may represent an area on which the reference sample of (−1,−1) position is located, D may represent an area on which the reference samples of (0,−1) to (W−1,−1) positions are located, and E may represent an area on which the reference samples of (W,−1) to (2 W−1, −1) positions are located.

In the case that a plurality of reference blocks is existed in a reference block position (or area) which is determined based on a category according to the intra prediction mode, whether to apply the CIIP to the current PU may be determined based on the CIIP flag of the reference block located at a relatively left or top side among the reference blocks based on a priority.

For example, since the CIIP flag of the left reference block to which sample 1 is included among the reference blocks located in D area is zero, the CIIP flag value of the current PU may be derived as zero. Meanwhile, in the case that the CIIP flag of a neighboring block according to a priority among neighboring blocks is 1, the CIIP flag for the current PU may be parsed, and based on the parsed CIIP flag, whether to apply the CIIP to the current PU may be determined.

Figure 26:
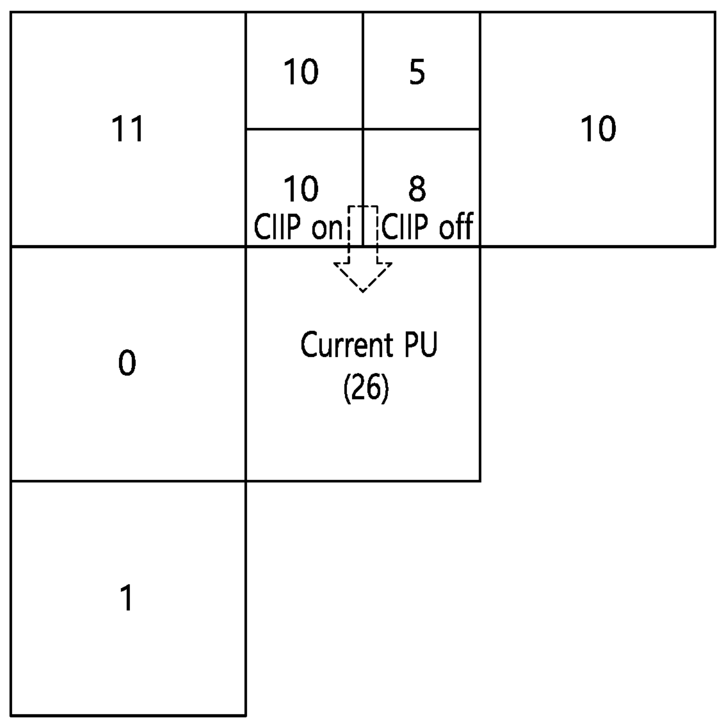
FIG. 26 illustrates an example of the case that a plurality of reference blocks is existed.

FIG. 26 illustrates an example of the case that a plurality of reference blocks is existed.

Referring to FIG. 26, an intra prediction mode index of the current PU is 26 and two reference blocks are existed in D area which is top side of the current PU. In this case, among the two reference blocks, since the CIIP flag of the left reference block is 1, a decoding device may parse a CIIP flag for the current PU, and based on the parsed CIIP flag, whether to apply the CIIP to the current PU may be determined.

Meanwhile, it may be determined whether to apply the CIIP to the PU and/or TUs in the PU area by considering the intra prediction mode of one or more reference blocks of the current PU. That is, in this case, based on the intra prediction mode of the reference block which is referred for each intra prediction mode of the current PU, it may be determined whether to apply the CIIP to the current PU.

For the CIIP mode, as described above, different CIIP scaling matrix may be applied according to the intra prediction mode. That is, the scaling matrix corresponding to the intra prediction mode of the current PU is applied o a transform coefficient of a neighboring block of the current TU and modified residual samples are generated, and reconstructed samples are generated based on the prediction samples for the current TU and the modified residual samples, and accordingly, the intra prediction mode of the neighboring block is also important to determine whether to apply the CIIP to the current PU. This is because a property of a transform coefficient of a neighboring block may be changed depending on the intra prediction mode. Therefore, according to the present invention, based on whether the intra prediction mode of the reference block of the current PU is the same as the intra prediction mode of the current block, it may be determined whether to apply the CIIP to the current PU.

Figure 27:
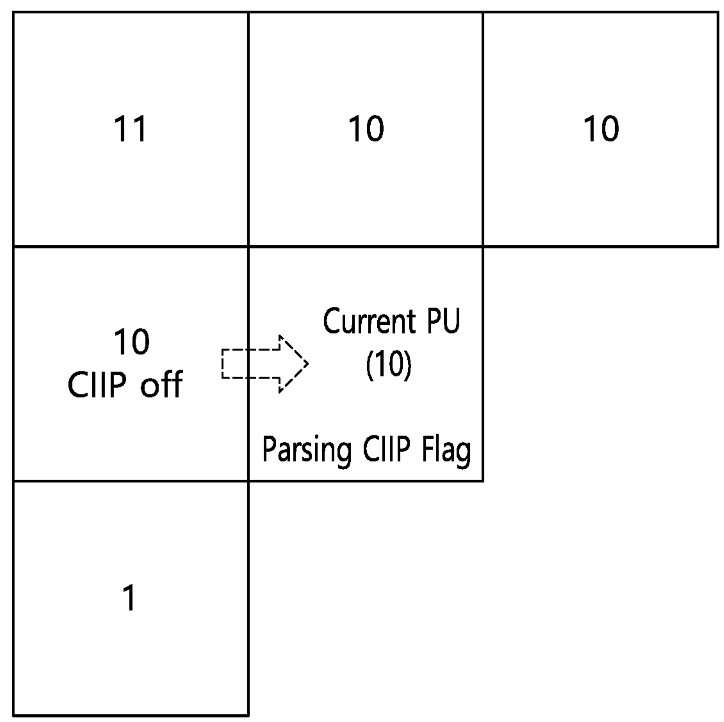
FIG. 27 illustrates an example of the case that the intra prediction modes of a reference block and a current PU are the same, and a CIIP flag for the reference block is zero.

FIG. 27 illustrates an example of the case that the intra prediction modes of a reference block and a current PU are the same, and a CIIP flag for the reference block is zero.

Referring to FIG. 27, an intra prediction mode index of the current PU is 10. In this case, a reference block is located on a left side of the PU. In the case that the intra prediction mode of the reference block is the same as the intra prediction mode of the current PU and a CIIP flag for the reference block is zero, a decoding device parses and obtains the CIIP flag for the current PU.

Figure 28:
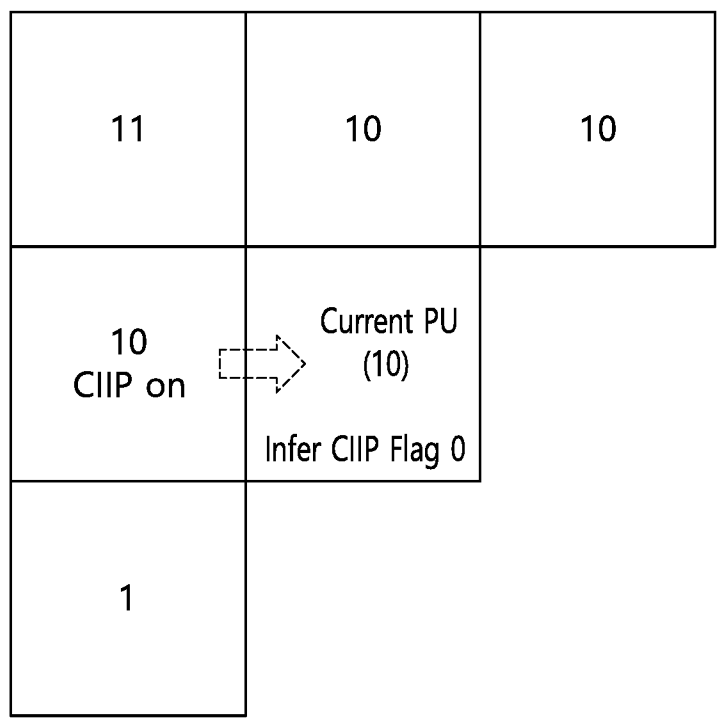
FIG. 28 illustrates an example of the case that intra prediction modes of a reference block and a current PU are the same, and a CIIP flag for the reference block is 1.

FIG. 28 illustrates an example of the case that intra prediction modes of a reference block and a current PU are the same, and a CIIP flag for the reference block is 1.

Referring to FIG. 28, in the case that the intra prediction mode of a reference block is the same as the intra prediction mode of a current PU, and a CIIP flag for the reference block is 1, a decoding device determines that the CIIP is not applied to the current PU. That is, in this case, the decoding device determines that the CIIP flag indicates zero without parsing the CIIP flag. Since the reference block is intra predicted based on the CIIP mode already and the reference block has the intra prediction mode which is the same as that of the current PU, and a scaling matrix of the same category may be applied, and accordingly, it may be determined that the reference block and the current block have the same or similar property. Therefore, for the current PU, without a separate CIIP flag transmission and reception, an encoding device and the decoding device may determine that the CIIP is not applied to the current PU.

Figure 29:
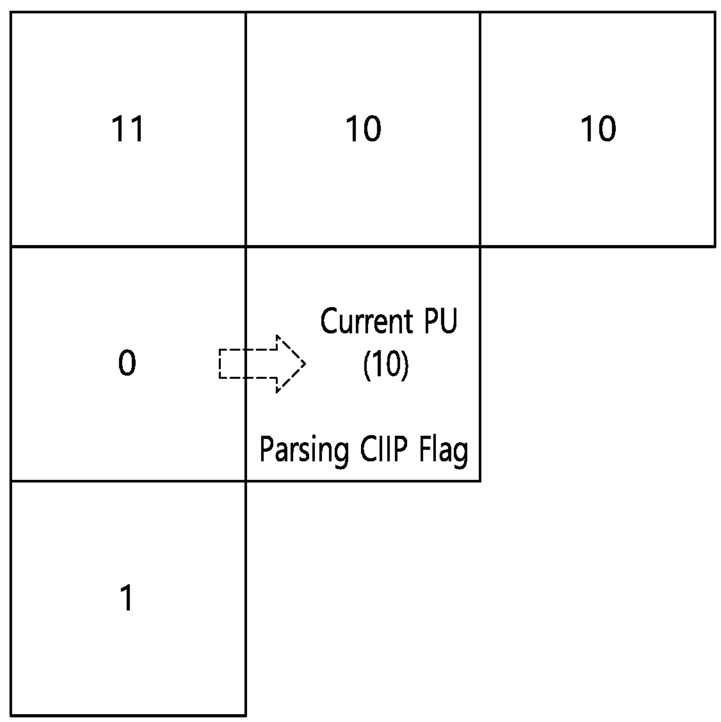
FIG. 29 illustrates an example of the case that intra prediction modes of a reference block and a current PU are different.

FIG. 29 illustrates an example of the case that intra prediction modes of a reference block and a current PU are different.

Referring to FIG. 29, an intra prediction mode index of the current PU is 10, and an intra prediction mode index of the reference block is zero, which is different. In this case, a decoding device may parse and obtain a CIIP flag for the current PU regardless of whether to apply the CIIP to the reference block, and determine whether the CIIP is applied to the PU based on the CIIP flag.

Accordingly, based on whether the intra prediction modes of the current PU and the reference block are the same and whether the CIIP mode is applied to the reference block, the procedure for the CIIP flag parsing and/or determining whether the CIIP is applied to the current PU may be classified as below.

TABLE 5

| Whether the intra prediction mode of the current PU and the reference block are the same | CIIP flag of the reference block | CIIP flag of the current PU |
|---|---|---|
| Same | 0 | Parsing |
| | 1 | Infer 0 |
| Different | 0 | Parsing |
| | 1 | Parsing |

According to the table above, in the case that the intra prediction modes of the current PU and the reference block are the same and the CIIP flag of the reference block is 1, the decoding device may derive the CIIP flag for the current PU as zero, and in this case, the encoding device may not transmit the CIIP flag for the current PU.

In the remaining cases, the decoding device parses and obtains the CIIP flag for the current PU transmitted as a bitstream format from the encoding device, and determines whether to apply the CIIP to the current PU based on the CIIP flag for the current PU.

Meanwhile, depending on the intra prediction mode of the current PU and the partitioning structure of neighboring blocks, a plurality of reference blocks may be considered. In this case, a plurality of reference blocks may have various intra prediction modes. In this case, based on the number of reference samples, whether to derive the CIIP flag may be determined. In this case, for example, in the case that among the considered reference samples, more than a half of the reference samples are located in one or more reference blocks having an intra prediction mode which is the same as the current PU, it is determined that the CIIP is not applied to the current PU and the CIIP flag for the current PU may be derived as zero.

Figure 30:
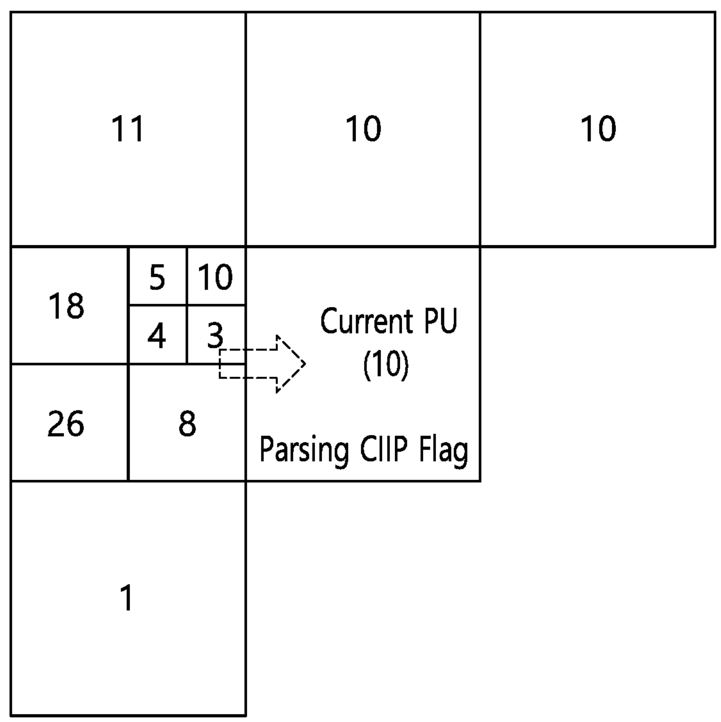
FIG. 30 illustrates the case that a plurality of reference blocks having various intra prediction modes is existed.

FIG. 30 illustrates the case that a plurality of reference blocks having various intra prediction modes is existed.

Referring to FIG. 30, an intra prediction mode index of a current PU is 10, and accordingly, the neighboring blocks located in a left side of the current PU may be reference blocks. In this case, in the case that a height of the current PU is H, the number of reference samples is H, and in the case that the number of reference samples which are decoded based on the same intra prediction mode among them is H/2 or more, the CIIP flag for the current PU may be derived as zero. That is, in the case that the number of reference pixels required to generate prediction samples is N and in the case that N/2 or more reference pixels are decoded based on the intra prediction mode (or prediction direction) which is the same as the intra prediction mode (or prediction direction) of the current PU, the CIIP flag for the current PU may be derived as zero.

In FIG. 30, three reference blocks are existed, and only one of the reference blocks has intra prediction mode index 10. As such, in the case that the number of reference pixels of the referred direction is less than H/2, a decoding device may parse and obtain the CIIP flag for the current PU, and based on the CIIP flag for the current PU, whether to apply the CIIP to the current PU may be determined.

Meanwhile, according to this embodiment, as represented in Table 4 above, a position or an area of a reference block may be predetermined according to the intra prediction mode of the current PU.

The intra prediction method described above according to the present invention may also be performed based on the following flowchart, for example.

Figure 31:
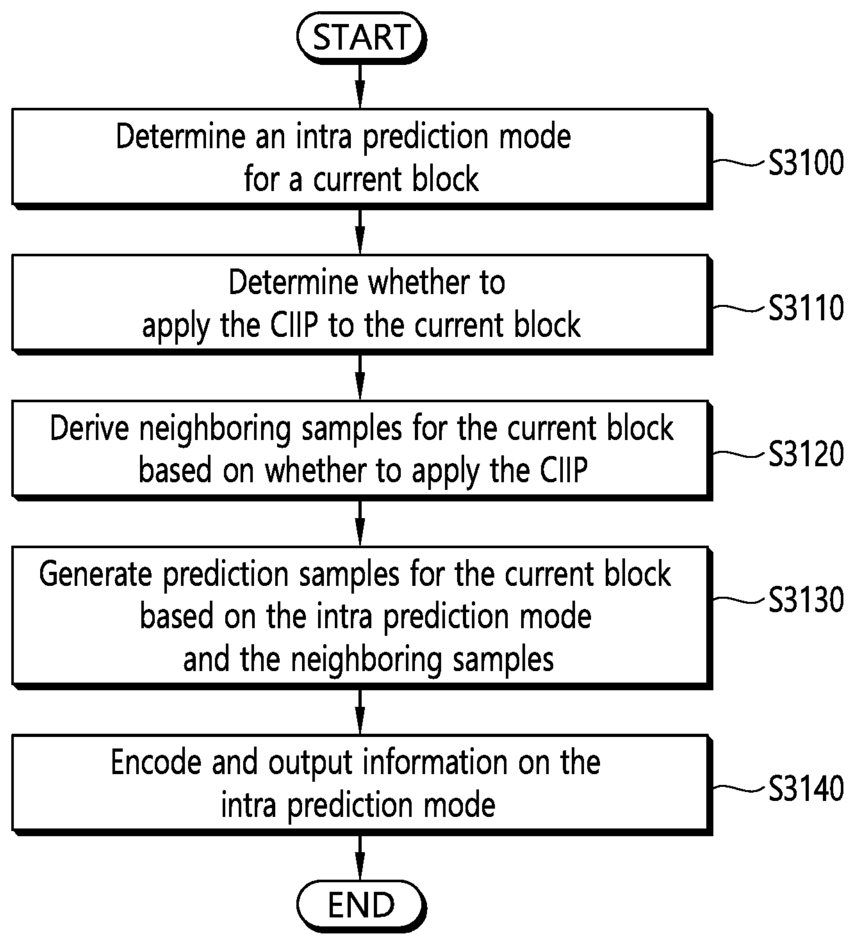
FIG. 31 schematically illustrates an example of an intra prediction method according to the present invention.

FIG. 31 schematically illustrates an example of an intra prediction method according to the present invention. The method disclosed in FIG. 31 may be performed by an encoding device. Particularly, for example, steps S3100 to S3130 of FIG. 31 may be performed by a predictor of the encoding device, and step S3140 may be performed by an entropy encoder of the encoding device.

Referring to FIG. 31, the encoding device determines an intra prediction mode for a current block (step, S3100). Here, the intra prediction mode may be one of a DC mode, a planar mode or angular modes. Here, the current block may correspond to a current TU. For example, at least one PU and at least one TU may be derived from a current CU. In this case, one or multiple TUs may be existed in an area of the PU. For example, in the current CU, inter/intra prediction type may be determined, and a particular intra prediction mode may be determined in the PU. In this case, the TUs in the PU area may share the determined intra prediction mode. The encoding device may determine an optimal intra prediction mode based on rate-distortion (RD) cost.

The encoding device determines whether to apply the CIIP to the current block (step, S3110). The encoding device may determine whether to apply the CIIP to the current block based on the RD cost. In this case, the encoding device may generate a CIIP flag that indicates whether to apply the CIIP, and may transmit the CIIP flag to the decoding device through a bitstream as described below Meanwhile, according to a specific condition, it may be determined that the CIIP is not applied to the current block without considering the RD cost. That is, it may be preconfigured that the CIIP is not applied to the current block when a specific condition is satisfied. In this case, the encoding device may not perform the procedure of generating the CIIP flag and transmitting it to the decoding device.

For example, the encoding device may determine whether the intra prediction mode for the current block belongs to a predefined non-CIIP prediction mode. In the case that the intra prediction mode belongs to the predefined non-CIIP prediction mode, the encoding device may determine that the CIIP is not applied to the current block. Alternatively, in the case that intra prediction mode does not belong to the predefined non-CUP prediction mode, the encoding device may determine whether to apply the CIIP to the current block, and generate a CIIP flag indicating whether to apply the CIIP.

Meanwhile, reference blocks may be defined, which are referred for determining whether to apply the CIIP. For example, the current block is located in an area of the current PU, and among neighboring blocks of the current PU, one or more reference blocks may be derived according to the intra prediction mode.

As an example, in the case that an index of the intra prediction mode for the current block is one of 14 to 22, the one or more reference blocks may be located in a left, a top-left or a top area of the current PU, in the case that an index of the intra prediction mode for the current block is one of 8 to 13, the one or more reference blocks may be located in a left area of the current PU, in the case that an index of the intra prediction mode for the current block is one of 23 to 28, the one or more reference blocks may be located in a top area of the current PU, in the case that an index of the intra prediction mode for the current block is one of 2 to 7, the one or more reference blocks may be located in a bottom-left or a left area of the current PU, and in the case that an index of the intra prediction mode for the current block is zero, the one or more reference blocks may be located in a bottom-left, a left, a top-left, a top or a top-right area of the current PU.

As another example, in the case that an index of the intra prediction mode for the current block is one of zero to 1, the one or more reference blocks may be located in a top-left area of the current PU, in the case that an index of the intra prediction mode for the current block is one of 2 to 6, the one or more reference blocks may be located in a bottom-left area of the current PU, in the case that an index of the intra prediction mode for the current block is one of 7 to 13, the one or more reference blocks may be located in a left area of the current PU, in the case that an index of the intra prediction mode for the current block is one of 14 to 22, the one or more reference blocks may be located in a top-left area of the current PU, in the case that an index of the intra prediction mode for the current block is one of 23 to 29, the one or more reference blocks may be located in a top area of the current PU, and in the case that an index of the intra prediction mode for the current block is one of 30 to 34, the one or more reference blocks may be located in a top-right area of the current PU.

The encoding device may determine whether to apply the CIIP to the current block based on at least one of coded bit flag (CBF) of the one or more reference blocks, an intra prediction mode or whether to apply the CIIP.

As an example, in the case that the one or more reference blocks have a CBF of zero, it may be configured that the CIIP is not applied to the current block. In the case that at least one of the one or more reference blocks have a CBF of 1, the encoding device may determine whether to apply the CIIP to the current block separately, and generate the CIIP flag.

As another example, in the case that the CIIP is applied to a specific reference block among the one or more reference blocks, it may be configured that the CIIP is not applied to the current block. Here, the specific reference block may be a reference block located in a left or a top side relatively among the reference blocks. In the case that the CIIP is not applied to a specific reference block among the one or more reference blocks, the encoding device may determine whether to apply the CIIP to the current block separately, and generate the CIIP flag.

As another example, in the case that the CIIP is applied to the one or more reference blocks and the one or more reference blocks have the intra prediction mode which is the same as the current block, it may be configured that the CIIP is not applied to the current block. In the case that the CIIP is not applied to the one or more reference blocks or the one or more reference blocks does not have the intra prediction mode which is the same as the current block, the encoding device may determine whether to apply the CIIP to the current block separately, and generate the CIIP flag.

The encoding device derives neighboring samples for the current block (step, S3120). The encoding device derives the neighboring samples of the current block for utilizing them for intra prediction. For example, in the case that the top-left sample position of the current block is (0,0), a height of the current block is H and a width of the current block is W, the neighboring samples may include samples of (−1,2N−1) to (−1,−1) and (0,−1) to (2N−1,−1).

Particularly, the encoding device may obtain quantized transform coefficients for the neighboring block, and obtain transform coefficients by quantizing the quantized transform coefficients. The encoding device may derive residual samples or modified residual samples based on the transform coefficients.

In the case that the CIIP is not applied to the current block, the encoding device may derive the residual samples by inversely transforming the transform coefficients.

In the case that the CIIP is applied to the current block, after the CIIP scaling procedure is performed for the transform coefficients, the encoding device may derive the modified residual samples by inversely transforming the transform coefficients which are CIIP scaled. In this case, the CIIP scaling procedure may be performed based on a predetermined scaling matrix. The scaling matrix may be determined according to the intra prediction mode for the current block.

The encoding device may derive the neighboring samples based on the residual samples or the modified residual samples.

The encoding device generates prediction samples for the current block based on the intra prediction mode and the neighboring samples (step, S3130). The encoding device may generate the prediction samples by using a part of or the whole neighboring samples according to the intra prediction mode.

The encoding device encodes and outputs information for the intra prediction mode (step, S3140). The encoding device may encode the information for the intra prediction mode and output it in a bitstream format. The bitstream may be transmitted to the decoding device through a network or a storage medium. In addition, the encoding device may encode information for residual for the current block and output it in the bitstream format. The information for residual for the current block may include quantized transform coefficients for the residual samples for the current block.

Meanwhile, the encoding device may encode the generated CIIP flag in the bitstream format.

Figure 32:
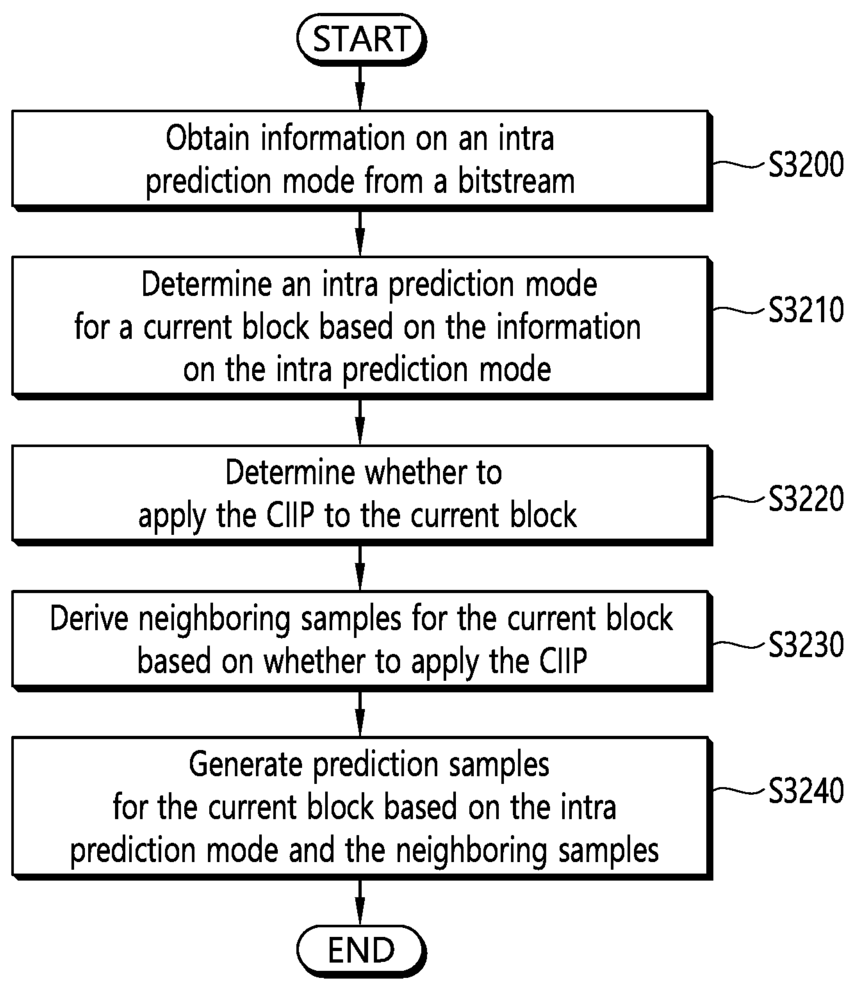
FIG. 32 schematically illustrates an example of an intra prediction method according to the present invention.

FIG. 32 schematically illustrates an example of an intra prediction method according to the present invention. The method disclosed in FIG. 32 may be performed by a decoding device. Particularly, for example, step S3200 of FIG. 32 may be performed by an entropy decoder, and steps S3210 to S3240 may be performed by a predictor of the decoding device.

Referring to FIG. 32, the decoding device obtains information for an intra prediction mode from a bitstream (step, S3200). The decoding device may decode the bitstream received from an encoding device and obtain the information for the intra prediction mode. The bitstream may be received through a network or a storage medium.

The decoding device determines an intra prediction mode for a current block based on the information for the intra prediction mode (step, S3210). Here, the intra prediction mode may be one of a DC mode, a planar mode or angular modes. Here, the current block may correspond to a current TU. For example, at least one PU and at least one TU may be derived from a current CU. In this case, one or multiple TUs may be existed in an area of the PU. For example, in the current CU, inter/intra prediction type may be determined, and a particular intra prediction mode may be determined in the PU. In this case, the TUs in the PU area may share the determined intra prediction mode.

The decoding device determines whether to the CIIP to the current block (step, S3220). The decoding device may parse or obtain a CIIP flag from the bitstream, and determine whether to the CIIP to the current block based on the CIIP flag. In addition, according to a specific condition, it may be determined or derived that the CIIP is not applied to the current block without receiving or parsing the CIIP flag. That is, it may be preconfigured that the CIIP is not applied to the current block when a specific condition is satisfied.

For example, the decoding device may determine whether the intra prediction mode for the current block belongs to a predefined non-CIIP prediction mode. In the case that the intra prediction mode belongs to the predefined non-CIIP prediction mode, the decoding device may determine that the CIIP is not applied to the current block. Alternatively, in the case that intra prediction mode does not belong to the predefined non-CUP prediction mode, the decoding device may obtain the CIIP flag for the current block from the bitstream, and determine whether to apply the CIIP to the current block based on the CIIP flag for the current block.

Meanwhile, reference blocks may be defined, which are referred for determining whether to apply the CIIP. For example, the current block is located in an area of the current PU, and among neighboring blocks of the current PU, one or more reference blocks may be derived according to the intra prediction mode.

As an example, in the case that an index of the intra prediction mode for the current block is one of 14 to 22, the one or more reference blocks may be located in a left, a top-left or a top area of the current PU, in the case that an index of the intra prediction mode for the current block is one of 8 to 13, the one or more reference blocks may be located in a left area of the current PU, in the case that an index of the intra prediction mode for the current block is one of 23 to 28, the one or more reference blocks may be located in a top area of the current PU, in the case that an index of the intra prediction mode for the current block is one of 2 to 7, the one or more reference blocks may be located in a bottom-left or a left area of the current PU, and in the case that an index of the intra prediction mode for the current block is zero, the one or more reference blocks may be located in a bottom-left, a left, a top-left, a top or a top-right area of the current PU.

As another example, in the case that an index of the intra prediction mode for the current block is one of zero to 1, the one or more reference blocks may be located in a top-left area of the current PU, in the case that an index of the intra prediction mode for the current block is one of 2 to 6, the one or more reference blocks may be located in a bottom-left area of the current PU, in the case that an index of the intra prediction mode for the current block is one of 7 to 13, the one or more reference blocks may be located in a left area of the current PU, in the case that an index of the intra prediction mode for the current block is one of 14 to 22, the one or more reference blocks may be located in a top-left area of the current PU, in the case that an index of the intra prediction mode for the current block is one of 23 to 29, the one or more reference blocks may be located in a top area of the current PU, and in the case that an index of the intra prediction mode for the current block is one of 30 to 34, the one or more reference blocks may be located in a top-right area of the current PU.

The decoding device may determine whether to apply the CIIP to the current block based on at least one of coded bit flag (CBF) of the one or more reference blocks, an intra prediction mode or whether to apply the CIIP.

As an example, in the case that the one or more reference blocks have a CBF of zero, it may be configured that the CIIP is not applied to the current block. In this case, the decoding device may determine that the CIIP is not applied to the current block without receiving or parsing the CIIP flag. Meanwhile, in the case that at least one of the one or more reference blocks have a CBF of 1, the decoding device may obtain the CIIP flag for the current block from the bitstream, and determine whether to apply the CIIP to the current block based on the CIIP flag.

As another example, in the case that the CIIP is applied to a specific reference block among the one or more reference blocks, it may be configured that the CIIP is not applied to the current block. In this case, the decoding device may determine that the CIIP is not applied to the current block without receiving or parsing the CIIP flag. Here, the specific reference block may be a reference block located in a left or a top side relatively among the reference blocks. Meanwhile, in the case that the CIIP is not applied to a specific reference block among the one or more reference blocks, the decoding device may obtain the CIIP flag for the current block from the bitstream, and determine whether to apply the CIIP to the current block based on the CIIP flag.

As another example, in the case that the CIIP is applied to the one or more reference blocks and the one or more reference blocks have the intra prediction mode which is the same as the current block, it may be configured that the CIIP is not applied to the current block. In this case, the decoding device may determine that the CIIP is not applied to the current block without receiving or parsing the CIIP flag. Meanwhile, in the case that the CIIP is not applied to the one or more reference blocks or the one or more reference blocks does not have the intra prediction mode which is the same as the current block, the decoding device may obtain the CIIP flag for the current block from the bitstream, and determine whether to apply the CIIP to the current block based on the CIIP flag.

The decoding device derives neighboring samples for the current block (step, S3230). The decoding device derives the neighboring samples of the current block for utilizing them for intra prediction. For example, in the case that the top-left sample position of the current block is (0,0), a height of the current block is H and a width of the current block is W, the neighboring samples may include samples of (−1,2N−1) to (−1,−1) and (0,−1) to (2N−1,−1).

Particularly, the decoding device may obtain quantized transform coefficients for the neighboring block from the bitstream, and obtain transform coefficients by quantizing the quantized transform coefficients. The decoding device may derive residual samples or modified residual samples based on the transform coefficients.

In the case that the CIIP is not applied to the current block, the decoding device may derive the residual samples by inversely transforming the transform coefficients.

In the case that the CIIP is applied to the current block, after the CIIP scaling procedure is performed for the transform coefficients, the decoding device may derive the modified residual samples by inversely transforming the transform coefficients which are CIIP scaled. In this case, the CIIP scaling procedure may be performed based on a predetermined scaling matrix. The scaling matrix may be determined according to the intra prediction mode for the current block.

The decoding device may derive the neighboring samples based on the residual samples or the modified residual samples.

The decoding device generates prediction samples for the current block based on the intra prediction mode and the neighboring samples (step, S3240). The decoding device may generate the prediction samples by using a part of or the whole neighboring samples according to the intra prediction mode.

The decoding device may obtain information for residual for the current block from the bitstream. The decoding device may derive the residual samples for the current block based on the information for residual for the current block, and generate reconstructed samples based on the residual samples for the current block. The information for residual for the current block may include quantized transform coefficients for the residual samples for the current block. The decoding device may generate a reconstructed picture based on the reconstructed samples.

According to the present invention described above, neighboring samples proper for an intra prediction of a current block may be derived, and accordingly, the intra prediction performance may be improved.

According to the present invention, different from the fact that a reconstructed sample of a neighboring block is used for neighboring samples for an intra prediction of a current block conventionally, CIIP scaling is applied to a transform coefficient of a neighboring block and modified or improved neighboring samples may be generated, and accordingly, intra prediction performance may be improved.

In addition, according to the present invention, based on a coded block flag (CBF) of a neighboring block, an intra prediction mode and/or whether to apply CIIP for a neighboring block, it may be determined whether to apply CIIP for a current block adaptively, and accordingly, prediction efficiency may be improved.

The above description is only illustrative of the technical concept of the present invention. Therefore, those skilled in the art may make various modifications and variations to the above description without departing from the essential features of the present invention. Accordingly, the embodiments disclosed herein are intended to be illustrative, not limiting, of the present invention. The scope of the present invention is not limited by these embodiments. The scope of protection of the present invention should be construed according to the following claims.

The method according to the present invention described above may be implemented in software. The encoding device and/or decoding device according to the present invention may be included in a device that performs image processing, for example, for a TV, a computer, a smart phone, a set-top box, or a display device.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:

1. A method for intra prediction performed by a decoding device, the method comprising:

obtaining information on an intra prediction mode from a bitstream;

deriving an intra prediction mode for a current block based on the information on the intra prediction mode;

determining whether to apply coefficient induced intra prediction (CIIP) to the current block;

deriving neighboring samples for the current block based on whether to apply the CIIP; and generating prediction samples for the current block based on the intra prediction mode and the neighboring samples, wherein the method further comprising:

obtaining quantized transform coefficients for a neighboring block from the bitstream;

obtaining transform coefficients by inversely quantizing the quantized transform coefficients;

deriving residual samples or modified residual samples based on the transform coefficients; and deriving the neighboring samples based on the residual samples or the modified residual samples, wherein based on a determination that the CIIP is not applied to the current block, the residual samples are derived by inversely transforming the transform coefficients, and wherein based on a determination that the CIIP is applied to the current block, after a CIIP scaling procedure is performed for the transform coefficients, the modified residual samples are derived by inversely transforming the transform coefficients which are CIIP scaled.

2. The method for intra prediction of claim 1, wherein the CIIP scaling procedure is performed based on a predetermined scaling matrix.

3. The method for intra prediction of claim 2, wherein the scaling matrix is determined based on the intra prediction mode for the current block.

4. The method for intra prediction of claim 1, further comprising:

determining whether the intra prediction mode for the current block belongs to a predefined non-CIIP prediction mode, when the intra prediction mode belongs to the predefined non-CIIP prediction mode, wherein it is determined that the CIIP is not applied to the current block.

5. The method for intra prediction of claim 4, further comprising:

when the intra prediction mode does not belong to the predefined non-CIIP prediction mode, obtaining a CIIP flag for the current block from the bitstream, wherein whether to apply the CIIP to the current block is determined based on the CIIP flag for the current block.

6. The method for intra prediction of claim 1, wherein the current block corresponds to a transform unit (TU), wherein the TU is located in an area of a current prediction unit (PU), wherein one or more reference blocks are derived according to the intra prediction mode among the neighboring blocks of the current PU, and wherein whether to apply the CIIP to the current block is determined based on at least one of coded bit flag (CBF) of the one or more reference blocks, an intra prediction mode or whether to apply the CIIP.

7. The method for intra prediction of claim 6, when an index of the intra prediction mode for the current block is one of 14 to 22, wherein the one or more reference blocks are located in a left, a top-left or a top area of the current PU, when an index of the intra prediction mode for the current block is one of 8 to 13, wherein the one or more reference blocks are located in a left area of the current PU, when an index of the intra prediction mode for the current block is one of 23 to 28, wherein the one or more reference blocks are located in a top area of the current PU, when an index of the intra prediction mode for the current block is one of 2 to 7, wherein the one or more reference blocks are located in a bottom-left or a left area of the current PU, and when an index of the intra prediction mode for the current block is zero, wherein the one or more reference blocks are located in a bottom-left, a left, a top-left, a top or a top-right area of the current PU.

8. The method for intra prediction of claim 6, when an index of the intra prediction mode for the current block is one of zero to 1, wherein the one or more reference blocks are located in a top-left area of the current PU, when an index of the intra prediction mode for the current block is one of 2 to 6, wherein the one or more reference blocks are located in a bottom-left area of the current PU, when an index of the intra prediction mode for the current block is one of 7 to 13, wherein the one or more reference blocks are located in a left area of the current PU, when an index of the intra prediction mode for the current block is one of 14 to 22, wherein the one or more reference blocks are located in a top-left area of the current PU, when an index of the intra prediction mode for the current block is one of 23 to 29, wherein the one or more reference blocks are located in a top area of the current PU, and when an index of the intra prediction mode for the current block is one of 30 to 34, wherein the one or more reference blocks are located in a top-right area of the current PU.

9. The method for intra prediction of claim 6, when the one or more reference blocks have a CBF of zero, it is determined that the CIIP is not applied to the current block, and when at least one of the one or more reference blocks have a CBF of 1, a CIIP flag for the current block is obtained from the bitstream, and whether to apply the CIIP to the current block is determined based on the CIIP flag for the current block.

10. The method for intra prediction of claim 6, when the CIIP is applied to a specific reference block among the one or more reference blocks, it is determined that the CIIP is not applied to the current block, and when the CIIP is not applied to a specific reference block among the one or more reference blocks, a CIIP flag for the current block is obtained from the bitstream, and whether to apply the CIIP to the current block is determined based on the CIIP flag for the current block.

11. The method for intra prediction of claim 10, wherein the specific reference block is a reference block located in a left or top side relatively among the reference blocks.

12. The method for intra prediction of claim 6, when the CIIP is applied to the one or more reference blocks and the one or more reference blocks have the intra prediction mode which is a same as the current block, it is determined that the CIIP is not applied to the current block, and when the CIIP is not applied to the one or more reference blocks or the one or more reference blocks does not have the intra prediction mode which is a same as the current block, a CIIP flag for the current block is obtained from the bitstream, and it is determine whether to apply the CIIP to the current block based on the CIIP flag.

13. A method for intra prediction performed by an encoding device, the method comprising:

deriving an intra prediction mode for a current block;

determining whether to apply coefficient induced intra prediction (CIIP) to the current block;

deriving neighboring samples for the current block based on whether to apply the CIIP;

generating prediction samples for the current block based on the intra prediction mode and the neighboring samples; and encoding and outputting information on the intra prediction mode, wherein the method further comprising:

obtaining quantized transform coefficients for a neighboring block;

obtaining transform coefficients by inversely quantizing the quantized transform coefficients;

deriving residual samples or modified residual samples based on the transform coefficients; and deriving the neighboring samples based on the residual samples or the modified residual samples, wherein based on a determination that the CIIP is not applied to the current block, the residual samples are derived by inversely transforming the transform coefficients, and wherein based on a determination that the CIIP is applied to the current block, after a CIIP scaling procedure is performed for the transform coefficients, the modified residual samples are derived by inversely transforming the transform coefficients which are CIIP scaled.

* * * * *